United States Patent
Iijima

(10) Patent No.: US 6,629,173 B2
(45) Date of Patent: *Sep. 30, 2003

(54) METHOD OF RESERVING BANDWIDTH FOR AN ISOCHRONOUS CHANNEL ON A SERIAL BUS NETWORK OF DEVICES

(75) Inventor: Yuko Iijima, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/462,546
(22) PCT Filed: May 12, 1999
(86) PCT No.: PCT/JP99/02445
§ 371 (c)(1), (2), (4) Date: Jan. 10, 2000
(87) PCT Pub. No.: WO99/59296
PCT Pub. Date: Nov. 18, 1999

(65) Prior Publication Data
US 2003/0115390 A1 Jun. 19, 2003

(30) Foreign Application Priority Data
May 12, 1998 (JP) .......................... 10-128474

(51) Int. Cl.$^7$ ............................................ G06F 13/00
(52) U.S. Cl. ........................ 710/107; 370/443
(58) Field of Search ............................ 710/124, 117, 710/305, 66, 110, 311; 370/371, 433, 412, 535, 474, 416; 714/748

(56) References Cited

U.S. PATENT DOCUMENTS 5,935,267 A * 8/1999 Hayakawa .................. 714/748
5,948,080 A * 9/1999 Baker
6,101,550 A * 8/2000 Zucker ....................... 709/241

FOREIGN PATENT DOCUMENTS

JP 7-154392 6/1995
JP 10-327173 12/1998

* cited by examiner

Primary Examiner—Sumati Lefkowitz
Assistant Examiner—Kim T. Huynh
(74) Attorney, Agent, or Firm—Frommer Lawrence & Haug LLP; William S. Frommer; Darren M. Simon

(57) ABSTRACT

In order to secure the resources on a bus positively and execute the data transmission during a time zone set by a timer of a plurality of electronic equipment connected by a serial bus, a reserve operation setting unit 22 inputs reserve operation setting information for setting a predetermined equipment connected to the bus in a predetermined state at a predetermined time. A reserve operation execution unit 23 sets a predetermined equipment connected to the bus in a predetermined state at a predetermined time based on the information input from the reserve operation setting unit 22 or the information stored in a reserve operation storage unit 22. The reserve operation storage unit 24 stores the information for setting a reserve operation input to the reserve operation setting unit 22. A bus resources reservation unit 25 acquires or releases the bus resources based on the input to the reserve operation setting unit 22 or the storage in the reserve operation storage unit 24. A bus resources reservation plan storage unit 26 stores a plan to acquire or release the bus resources based on the reserve information of the equipment connected to the bus.

10 Claims, 22 Drawing Sheets

IRD 1

FIG. 8

| address offset | contents |
|---|---|
| 000h | STATE_CLEAR |
| 004h | STATE_SET |
| 008h | NODE_IDs |
| 00Ch | RESET_START |
| 018h-01Ch | SPLIT_START |
| 200h | CYCLE_TIME |
| 210h | BUSY_TIMEOUT |
| 21Ch | BUS_MANAGER |
| 220h | BANDWIDTH_AVAILABLE |
| 224h-228h | CHANNELS_AVAILABLE |

FIG. 11

| Addr | Register |
|---|---|
| 900h | Output Master Plug Register |
| 904h | Output Plug Control Register #0 |
| 908h | Output Plug Control Register #1 |
| ⋮ | |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 12A oMPR

| data rate capability | broadcast channel base | non-persistent extension field | persistent extension field | reserved | number of output plugs |
|---|---|---|---|---|---|
| 2 | 6 | 8 | 8 | 3 | 5 (but) |

FIG. 12B oPCR[n]

| on-line | broadcast connection counter | point-to-point connection counter | reserved | channel number | reserved | data rate | overhead ID | payload |
|---|---|---|---|---|---|---|---|---|
| 1 | 6 | 6 | 2 | 6 | 1 | 2 | 4 | 10 (but) |

FIG. 12C iMPR

| data rate capability | reserved | non-persistent extension field | persistent extension field | reserved | number of input plugs |
|---|---|---|---|---|---|
| 2 | 6 | 8 | 8 | 3 | 5 (but) |

FIG. 12D iPCR[n]

| on-line | broadcast connection counter | point-to-point connection counter | reserved | channel number | reserved |
|---|---|---|---|---|---|
| 1 | 1 | 6 | 2 | 6 | 16 (but) |

FIG. 22

| period | reserved | data |
|---|---|---|
| 04 | 12 | 16 (bit) |

FIG. 23

| 0 | not valid |
|---|---|
| 1 | 5 min |
| 2 | 15 min |
| 3 | 30 min |
| 4 | 1 hour |
| 5 | 2 hour |
| 6 | reserved |

FIG. 24

| offset | | |
|---|---|---|
| 00h | Channels_available_hi | |
| 04h | Channels_available_lo | |
| 08h | reserved | bw_remaining |
| 0Ch | ⋮ | |
| ⋮ | ⋮ | ⋮ |
| | Channels_available_hi | |
| | Channels_available_lo | |
| | reserved | bw_remaining |

METHOD OF RESERVING BANDWIDTH FOR AN ISOCHRONOUS CHANNEL ON A SERIAL BUS NETWORK OF DEVICES

TECHNICAL FIELD

The present invention relates to an information processing apparatus, an information processing method and an information processing system, and a distribution medium, or more in particular to an information processing apparatus, an information processing method and an information processing system, and a distribution medium for securing bus resources positively by the reserve operation using a timer of electronic equipment.

BACKGROUND ART

A standard is laid down for the IEEE1394 serial bus capable of connecting a plurality of satellite broadcast receivers (Integrated Receiver/Decoders: IRDs), VTRs (Video Tape Recorders), video-camera integrated digital VTRs, HDDs (Hard Disk Drives) for recording video and audio signals, MD (Mini Disk: trade name) decks, PCs (Personal Computers) or the like electronic equipment (hereinafter referred to as the equipment). In the case where a reserved operation is executed using a timer by two of the equipment connected to the particular bus, the data transmission may result. A case in point is that a signal of an independent voice of BS11 channel is received by the IRD, transmitted to and recorded in the MD deck during the period from 4:15 to 5:45, Apr. 24, 1998. The IRD and the MD deck acquire the band and the channel for the isochronous communication of IEEE1394 immediately before execution of the reserve operation. The IRD and the MD deck transmit data using the band and channel of the isochronous communication thus acquired.

The band and channel for isochronous communication of the IEEE1394 serial bus is finite resources on the bus, and only a predetermined number or less of bands and channels can be used at the same time.

If the user operates other equipment connected to the bus and thereby uses the band of IEEE1394 isochronous communication in a wider band or uses all the channels of IEEE1394 isochronous communication as a reserve operation, the MD deck may fail to record.

Also, in the case where the reservation time of the operation accompanied by the data transmission of two different equipment are overlapped with each other, the data transmission may fail if the operating band or channel for the particular data transmission are insufficient.

The problem is posed, therefore, that due to the failure to acquire the bus resources such as when the operating band or channel for data transmission are insufficient, the reserve operation accompanied by the data transmission of a plurality of equipment may fail.

DISCLOSURE OF THE INVENTION

The present invention has been developed in view of this situation, and the object thereof is to provide an information processing apparatus, an information processing method and an information processing system and a distribution medium capable of acquiring bus resources positively and assuring accurate reserve operation even when accompanied by data transmission.

According to a first aspect of the invention, there is provided an information processing apparatus connected to a bus for acquiring the resources on the bus, comprising reserve operation setting input means for inputting a reserve operation setting for setting a predetermined other information processing apparatus in a predetermined state at a predetermined time, reserve operation storage means for storing the information on the reserve operation setting input from said reserve operation setting input means, and bus resources reservation means for reserving said resources on said bus required for said reserve operation based on the information on the reserve operation input to said reserve operation setting input means. With this information processing apparatus, the bus resources are reserved, and therefore the data transmission can be executed positively.

According to a second aspect of the invention, there is provided the information processing apparatus of the first aspect, in which the reservation processing for said resources on said bus by said bus resources reservation means is for securing said resources on said bus when the reserve operation is set by said reserve operation setting input means. With this information processing apparatus, the resources on the bus are secured at the time of a reserve operation and therefore the reservation processing can be positively executed using the secured resources.

According to a third aspect of the invention, there is provided the information processing apparatus of the second aspect, in which in the case where the reserve operation is set by said reserve operation setting input means and said resources cannot be secured, said bus resources reservation means repetitively performs the processing for securing said resources on said bus during the period before the reservation start time designated by the setting of said reserve operation setting input means. With this information processing apparatus, even in the case where the resources on the bus cannot be secured at the time point of the reserve operation, the resources on the bus can be secured by the subsequent processing.

According to a fourth aspect of the invention, there is provided the information processing apparatus of the first aspect, in which the resources reservation processing on said bus by said bus resources reservation means is for securing said resources on said bus at a predetermined time before the reservation start time designated by the setting by said reserve operation setting input means. With this information processing apparatus, the resources on the bus are secured and the reservation processing using the secured resources is executed positively by the processing before the reservation start time after a reserve operation.

According to a fifth aspect of the invention, there is provided the information processing apparatus of the fourth aspect, in which said predetermined time is a timing a predetermined time before said reservation start time. With this information processing apparatus, superior resources for the reserve operation can be secured by setting the timing of securing the resources on the bus appropriately while a comparatively small proportion of the resources on the bus is occupied.

According to a sixth aspect of the invention, there is provided the information processing apparatus of the first aspect, further comprising reserve operation execution means for setting another predetermined information processing apparatus connected to said bus in a predetermined state at a predetermined time based on the information stored in said reserve operation storage means. With this information processing apparatus, another information processing apparatus can be controlled based on the reserve operation, so that the data can be transmitted using the secured resources and the information processing due to the data transmission can be controlled in satisfactory manner.

According to a seventh aspect of the invention, there is provided the information processing apparatus of the first aspect, in which said bus resources reservation means releases the resources after the lapse of a reservation end time stored in said reserve operation storage means. With this information processing apparatus, upon the arrival of the reservation end time, the resources on the bus are released and can be used for the processes other than the reserve operation.

According to an eighth aspect of the invention, there is provided the information processing apparatus of the first aspect, in which said bus resources reservation means includes bus resources reservation information storage means for producing information for reserving said resources on said bus during a period from a predetermined first time from a predetermine second time based on the reserve operation setting input by said reserve operation setting input means, and storing the information for reserving said resources on said bus of said bus resources reservation means. With this information processing apparatus, the resources are reserved for each time zone, and therefore the bus can be utilized effectively while executing the data transmission positively.

According to a ninth aspect of the invention, there is provided the information processing apparatus of the eighth aspect, in which said bus resources reservation information storage means includes a band and channel reservation means for reserving the band of said bus and a channel specifying said band for conducting the isochronous communication for each time zone during the period from a predetermined first time to a predetermined second time, and reservation schedule storage means for storing the units and the date of said time zone of said band and channel reservation means. With this information processing apparatus, the resources for data transmission by the isochronous communication can be reserved on the bus satisfactorily.

According to a tenth aspect of the invention, there is provided an information processing method for acquiring the resources on the bus connected to a plurality of equipment, comprising the reserve operation setting input step of inputting the setting of a reserve operation for setting a predetermined equipment connected to said bus in a predetermined state at a predetermined time, the reserve operation storage step of storing the information on the setting of the reserve operation input in said reserve operation setting input step, and the bus resources reservation step of reserving said resources on said bus required for said reserve operation based on the information on the reserve operation input in said reserve operation setting input step. With this information processing method, the bus resources are reserved in advance, and therefore the data transmission can be executed accurately.

According to an 11th aspect of the invention, there is provided an information processing method of the tenth aspect, in which the processing for reserving said resources on said bus in said bus resources reservation step is for securing said resources on said bus immediately after the reserve operation in said reserve operation setting input step. With this information processing method, the resources on the bus are secured at the time point of the reserve operation and the reserve processing using the secured resources can be positively executed.

According to a 12th aspect of the invention, there is provided the information processing method of the 11th aspect, in which in the case where said resources cannot be secured immediately after the reserve operation in said reserve operation setting input step, said bus resources reservation step repeatedly performs the processing for securing said resources on said bus until said resources are secured before the reservation start time designated by said reserve operation setting input step. With this information processing method, even in the case where the resources on the bus cannot be secured at the time point of the reserve operation, the resources on the bus can be secured by the subsequent processing.

According to a 13th aspect of the invention, there is provided the information processing method of the tenth aspect, in which the processing for reserving the resources on said bus in said bus resources reservation step is for securing said resources on said bus at a predetermined time during the period from the setting in said reserve operation setting input step to the reservation start time designated by said setting. With this information processing method, the resources on the bus are secured by the processing after the reserve operation before the reservation start time, so that the reservation processing can be accurately executed using the resources thus secured.

According to a 14th aspect of the invention, there is provided the information processing method of the 13th aspect, in which said predetermined time is a timing a predetermined time before said reservation start time. With this information processing method, by appropriately setting the timing for securing the resources on the bus, superior resources for the reserve operation can be secured with a comparatively small proportion of the resources occupied on the bus.

According to a 15th aspect of the invention, there is provided the information processing method of the tenth aspect, further comprising the reserve operation execution step of setting a predetermined equipment connected to the bus in a predetermined state at a predetermined time based on the information stored in said reserve operation storage step. With this information processing method, it is possible to control the connected equipment based on the reserve operation so that the data can be transmitted using the secured resources and the information processing attributable to the particular data transmission can be controlled in satisfactory manner.

According to a 16th aspect of the invention, there is provided the information processing method of the tenth aspect, in which said bus resources reservation step is for releasing the resources upon the lapse of the reservation end time stored in said reserve operation storage step. With this information processing method, the resources on the bus are released and become available for use in the processing other than the reserve operation upon the lapse of the reservation end time.

According to a 17th aspect of the invention, there is provided a medium for providing a computer-readable program for causing the information processing apparatus connected to a bus for acquiring the resources on said bus to execute the process including the reserve operation setting input step of inputting the setting of the reserve operation for setting a predetermined other information processing apparatus in a predetermined state at a predetermined time, the reserve operation storage step of storing the information on the setting of the reserve operation input in said reserve operation setting input step, and the bus resources reservation step for reserving said resources on said bus required for said reserve operation based on the reserve operation information input in said reserve operation setting input step. With this distribution medium, the bus resources are reserved in advance, and therefore, a medium is obtained by which a program can be provided for executing the reservation processing capable of executing the data transmission accurately.

According to an 18th aspect of the invention, there is provided an information processing apparatus connected to a bus for managing the resources on said bus, comprising band and channel reservation means for reserving the band of said bus and the channel specifying said band for each time zone and reservation schedule storage means for storing the unit and date of said time zone of said band channel reservation means. With this information processing apparatus, the resources are reserved for each time zone, and therefore the bus can be effectively utilized while executing the data transmission accurately.

According to a 19th aspect of the invention, there is provided an information processing method for managing the resources on a bus connected to a plurality of equipment, comprising the band and channel reservation step of reserving the band of said bus and the channel specifying said band for each time zone and the reservation schedule storage step of storing the unit and the date of said time zone in said band and channel reservation step. With this information processing method, the resources are reserved for each time zone and therefore the bus can be effectively utilized while executing the data transmission accurately.

According to a 20th aspect of the invention, there is provided a medium for providing a computer-readable program for causing the information processing apparatus managing the resources on said bus to execute the process including the band and channel reservation step of reserving the band of said bus and the channel specifying said band for each time zone, and the reservation schedule storage step for storing the unit and date of said time zone in said band channel reservation step. With this distribution medium, a program is provided by which the resources are reserved for each time zone, so that the bus can be utilized effectively while at the same time executing the data transmission accurately.

According to a 21st aspect of the invention, there is provided an information processing system comprising a first information processing apparatus and a second information processing apparatus connected to a bus, in which said first information processing apparatus includes reserve operation setting input means for inputting the setting of the reserve operation for setting the apparatus in a predetermined state at a predetermined time, and reserve operation storage means for storing the information on the reserve operation input by said reserve operation setting input means and outputting the information on the reserve operation in response to the request from said second information processing apparatus, and said second information processing apparatus includes bus resources reservation means for reserving the resources on said bus required for the reserve operation of said first information processing apparatus based on the information of said reserve operation supplied from said first information processing apparatus. With this information processing system, the second information processing apparatus reserves the bus resources, and therefore the first information processing apparatus can execute the data transmission accurately.

BRIEF DESCRIPTION OF THE DRAWINGS

FIG. 8 is a diagram for explaining the position, name and function of a main CSR.

FIG. 11 is a diagram for explaining the configuration of the PCR.

FIG. 12 is a diagram showing the configuration of oMPR, oPCR, iMPR and iPCR.

FIG. 22 is a diagram for explaining the structure of mPRR.

FIG. 23 is a diagram for explaining the time division unit of PRR for the data stored in the period field of mPRR.

FIG. 24 is a diagram for explaining the structure of PRR.

BEST MODE FOR CARRYING OUT THE INVENTION

Embodiments of the present invention will be explained below.

Figure 1:
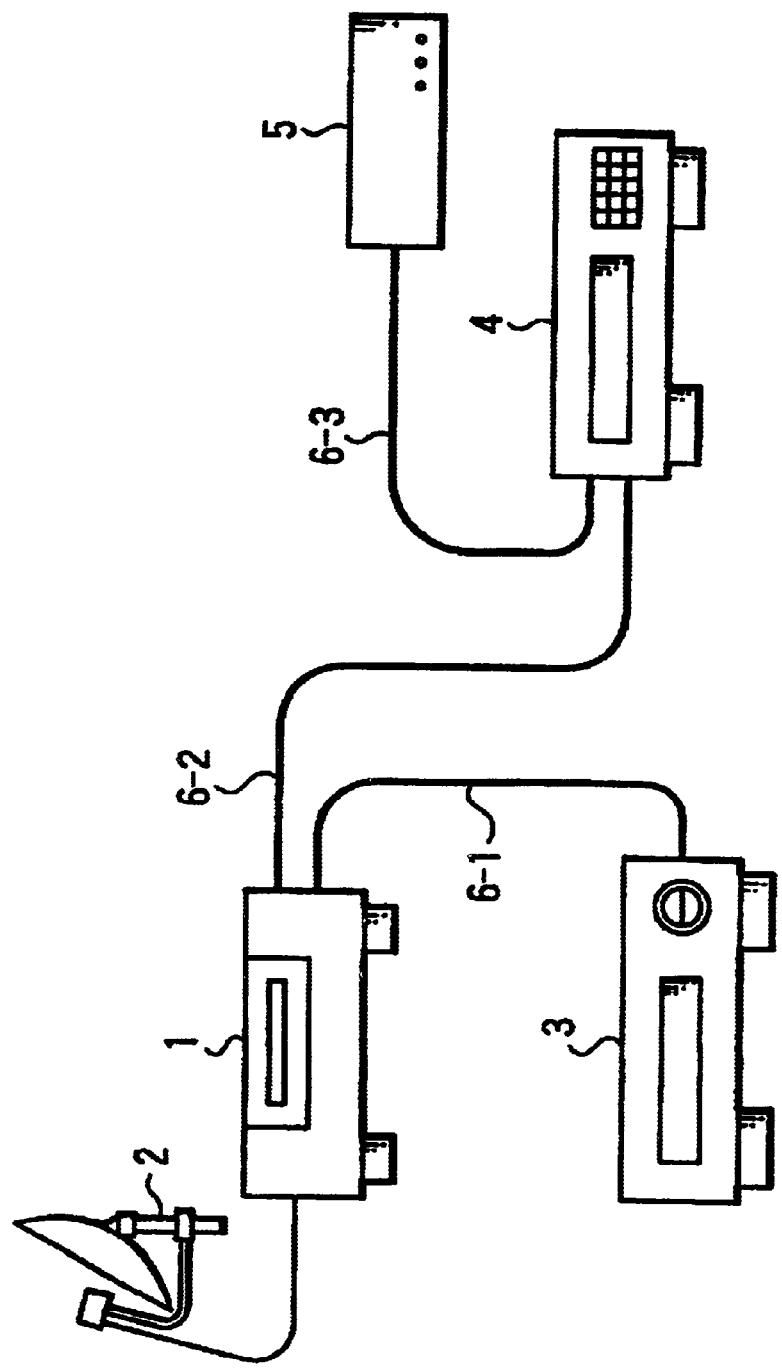
FIG. 1 is a diagram showing a configuration of an embodiment of the present invention.

FIG. 1 is a diagram showing a configuration according to an embodiment of the invention. An IRD (Integrated Receiver/Decoder), a MD deck 3, a VTR 4 and a HDD 5 connected to an antenna 2 are connected to each other by IEEE1394 serial buses 6-1 to 6-3 (hereinafter referred to simply as the bus 6 in the case where individual distinction is not required).

In FIG. 1, four equipment including the IRD 1 are connected as an example. Nevertheless, the types and the number of units of the equipment connected are not specifically limited. These equipment satisfy the IEEE1394 standard and the IEC61883 specifying the AV (audio visual) data transmission according to IEEE1394 and constitute nodes providing units accessible according to IEEE1394.

Figure 2:
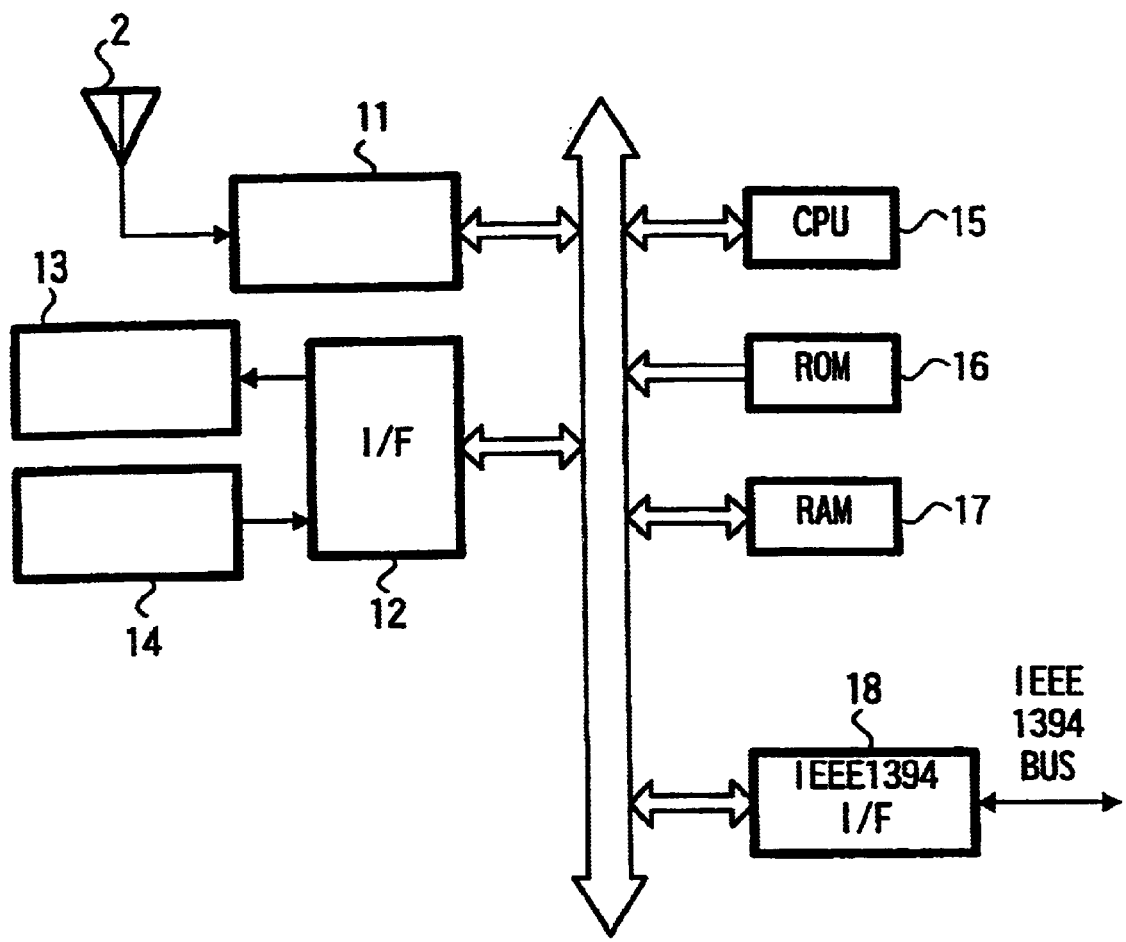
FIG. 2 is a diagram showing a hardware configuration of the IRD.

FIG. 2 is a diagram showing a hardware configuration of the IRD 1. A tuner 11 activates an antenna 2, and based on the signal from the antenna 2, outputs a video signal and an audio signal. A LCD (Liquid Crystal Display) 13 and a touch panel 14 are connected to an internal bus through an input/output interface 12. The LCD 13 displays the data supplied from the tuner 11, the CPU (Central Processing Unit) 15 or the IEEE1394 interface 18. The touch panel 14 is adapted to supply a signal corresponding to the user operation to the input/output interface 12.

The CPU 15 actually executes various programs. A ROM (Read-Only Memory) 16 stores basically fixed data among the arithmetic parameters or the programs used by the CPU 15. A RAM (Random Access Memory) 17 stores the program used for the execution of the CPU 15 and the parameters appropriately changed in the execution of the program. The IEEE1394 interface 18 is an input/output interface based on the IEEE1394 connected with IEEE1394 serial buses 6-1 and 6-2. The tuner 11, the input/output interface 12, the CPU 15, the ROM 16, the RAM 17 and the IEEE1394 interface 18 are interconnected by an internal bus.

Figure 3:
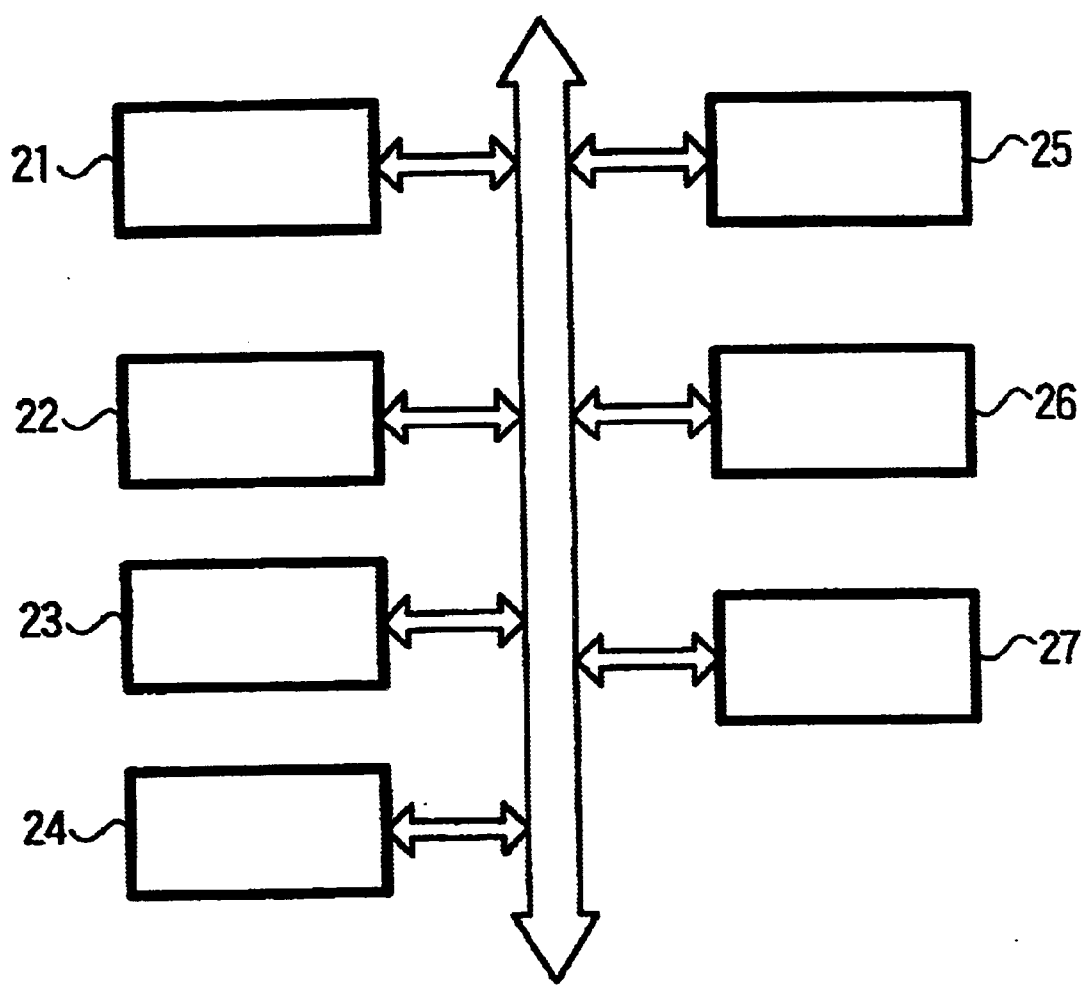
FIG. 3 is a function block diagram of the IRD.

FIG. 3 is a function block diagram of the IRD 1. The tuner 21 activates the antenna 2, and based on the signal from the antenna 2, supplies a digital video signal and audio signal. A reserve operation setting unit 22 inputs the information of setting the reserve operation for setting a predetermined equipment connected on the bus in a predetermined state (for example, the power is switched on, the BS channel 9 is selected, or an independent voice is output) at a predetermined time. The information on the setting of the reserve operation may be input by the user directly operating the IRD 1, or by transmitting the data to the IRD 1 from other equipment connected to the bus 6. The reserve operation execution unit 23, based on the information input from the reserve operation setting unit 22 or the information stored in the reserve operation storage unit 24, sets the IRD 1 itself or predetermined other equipment connected to the bus 6 in a predetermined state at a predetermined time. The reserve operation storage unit 24 stores the information on the setting of the reserve operation input to the reserve operation setting unit 22.

A bus resource reservation unit 25, based on the input to the reserve operation setting unit 22 or the storage in the reserve operation storage unit 24, executes the setting of the equipment connected to the bus 6 for input/output connection, and acquires or releases the resources of the bus 6 connected to the IRD 1. The bus resources reserve unit 25 further forms a plan to acquire or release the bus resources. The bus resources reservation plan storage unit 26, based on the reservation information of the equipment connected to the bus 6 connected with the IRD 1, stores the plan to acquire or release the particular bus resources. A serial bus control unit 27 connects the IRD 1 to other equipment through the IEEE1394 serial bus 6 based on the IEEE1394.

Figure 4:
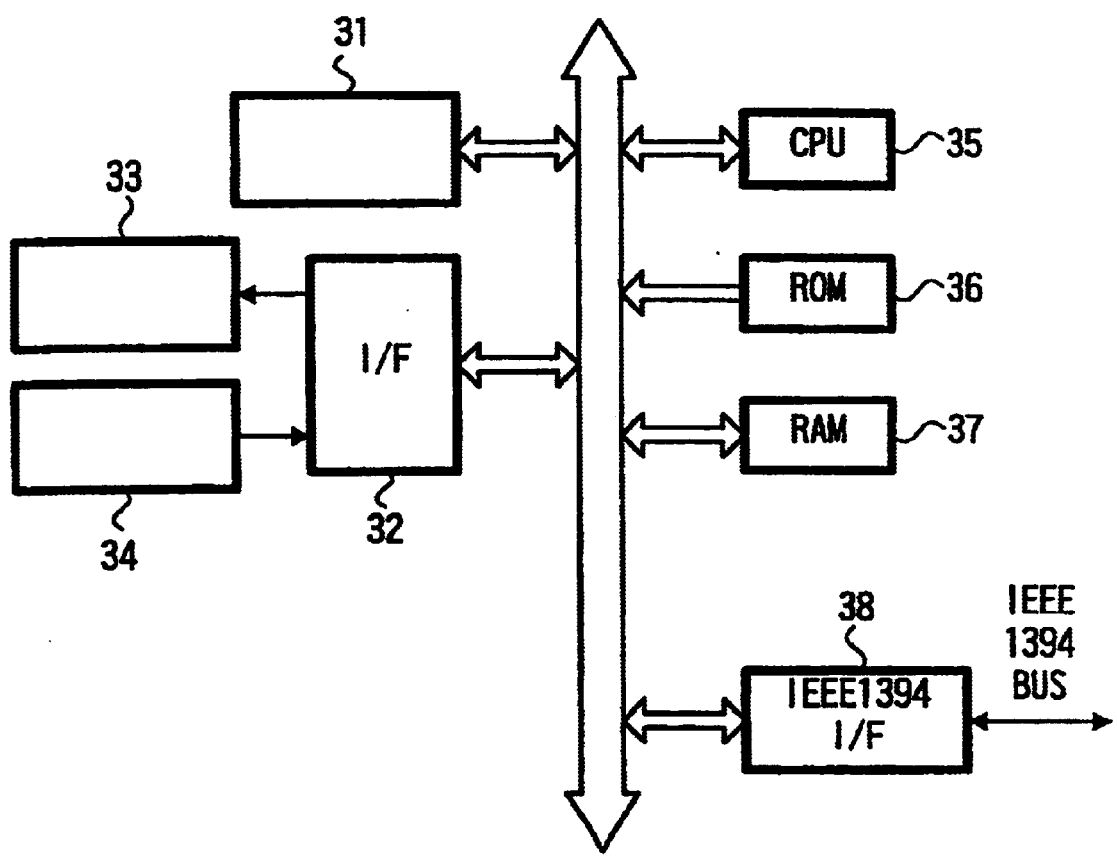
FIG. 4 is a diagram showing a hardware configuration of the MD deck.

FIG. 4 is a diagram showing a hardware configuration of the MD deck 3. A record/reproduce unit 31 records or reproduces the data in or from the MD (not shown) mounted, based on the input signal. The input/output interface 32, the LCD 33, the touch panel 34, the CPU 35, the ROM 36, the RAM 37 and the IEEE1394 interface 38 perform the functions similar to the corresponding parts of the IRD 1 in FIG. 2, and therefore will not be described.

Figure 5:
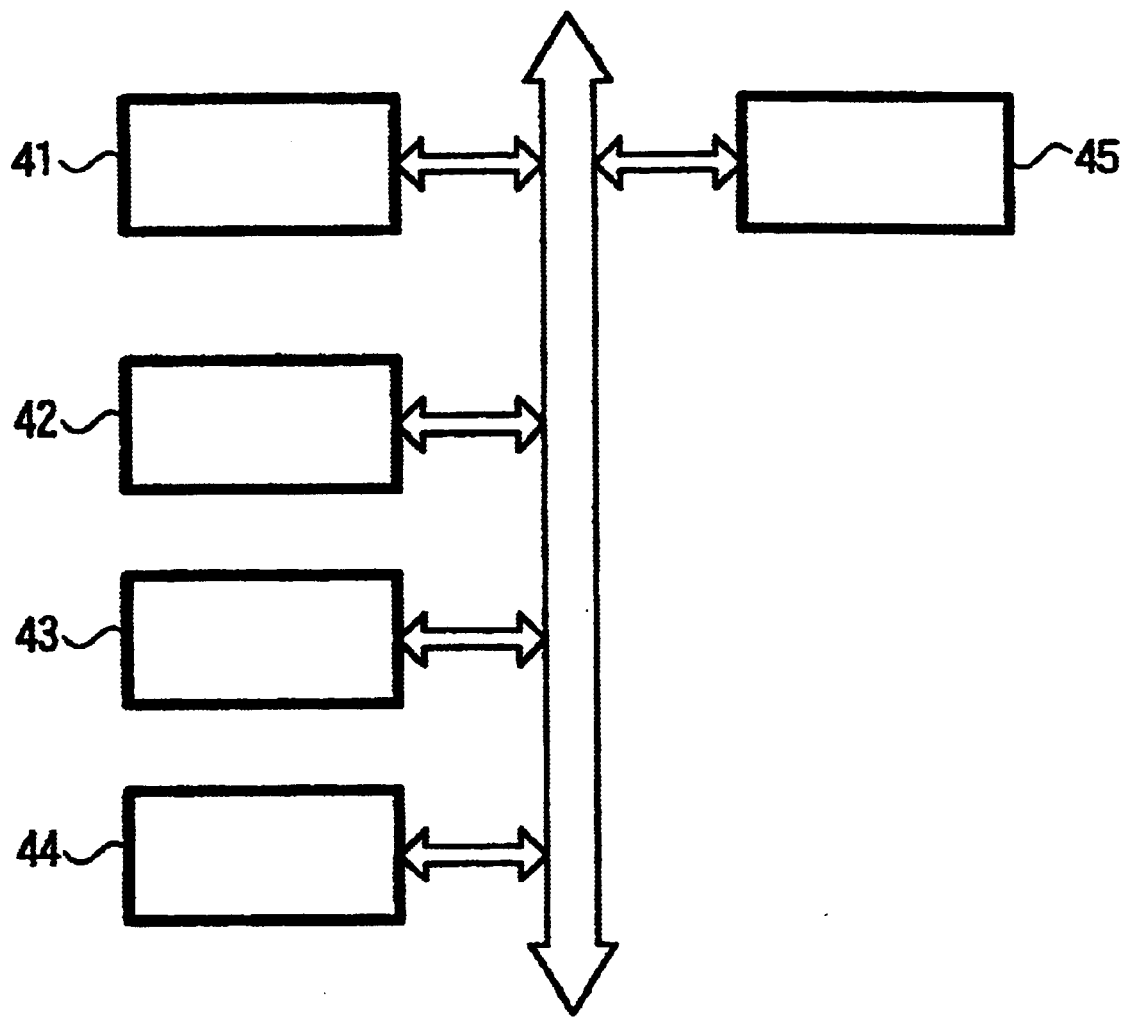
FIG. 5 is a function block diagram of the MD deck.

FIG. 5 is a function block diagram of the MD deck 3. The record/reproduce unit 41 records data in the MD based on an input signal, reads data from the MD and outputs a predetermined signal. A reserve operation setting unit 42 inputs the information on the setting of a reserve operation for setting the MD deck 3 in a predetermined state at a predetermined time. The information on the setting of the reserve operation may be input by the user operating the MD deck 3 directly, or by transmitting the data from other equipment connected with the bus to the MD deck 3. A reserve operation execution unit 43 sets the MD deck 3 in a predetermined state at a predetermined time based on the information input from the reserve operation setting unit 42 or the information stored in the reserve operation storage unit 44. The reserve operation storage unit 44 and the serial bus control unit 45 perform the functions similar to the reserve operation storage unit 24 and the serial bus control unit 27 of FIG. 3, respectively, and therefore will not be described.

Figure 6:
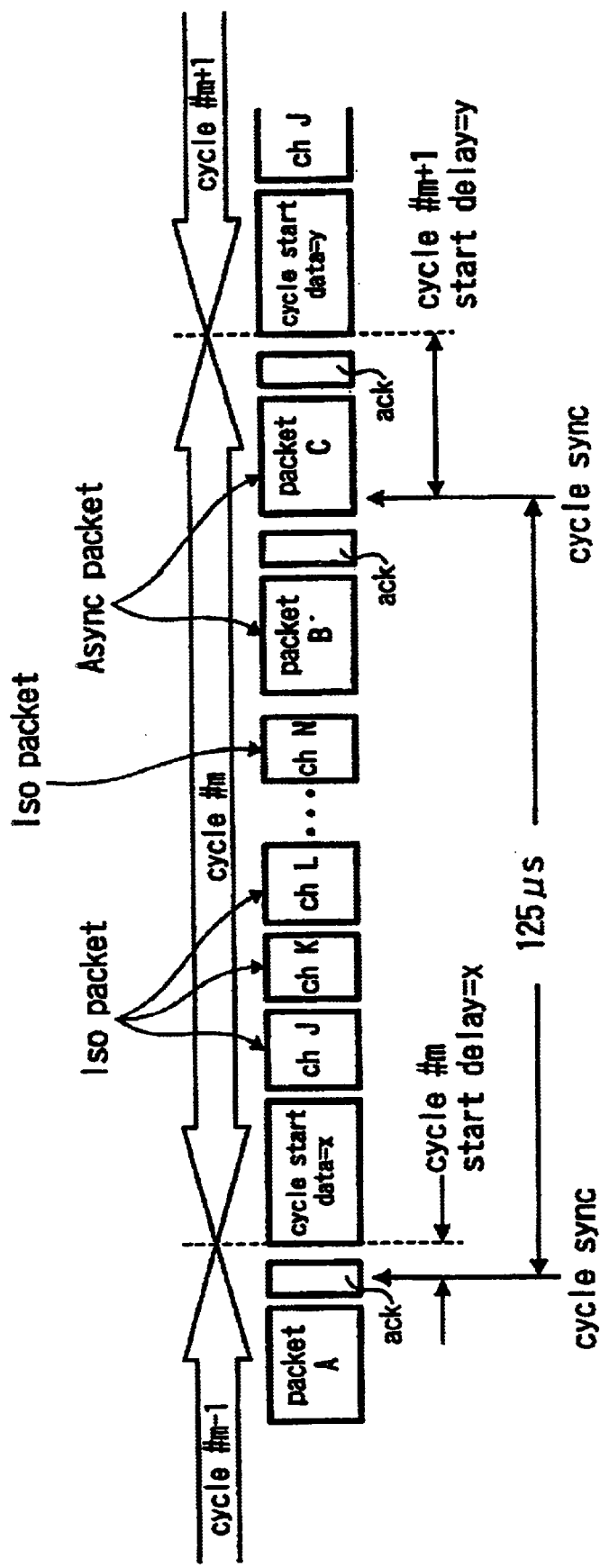
FIG. 6 is a diagram showing the cycle structure of data transmission of the equipment connected according to IEEE1394.

FIG. 6 is a diagram showing a cycle structure for data transmission of the equipment connected according to IEEE1394. In IEEE1394, the data are divided into packets and transmitted by time division based on the cycle 125 $\mu$s long. This cycle is produced by the cycle start signal supplied from a node (any one of the equipment shown in FIG. 1) having the cycle master function. An isochronous packet secures the band (called the band in spite of the unit expressed in time) required for transmission from the head of all cycles. As a result, in the isochronous transmission, a predetermined amount of transmission of data within a predetermined time is guaranteed, and so is the real time characteristic of the data. In the case of a transmission error, however, there is no protective means available and the data are lost. A node which has secured the bus as the result of arbitration during the time when the bus is not used for isochronous transmission of each cycle sends out an asynchronous packet. In the asynchronous transmission, an accurate transmission free of drop-off is guaranteed by use of acknowledge and retrial. Nevertheless, the transmission timing may remain unfixed and the real time characteristic of the data may not be secured.

For a predetermined node to perform the isochronous transmission, the particular node is required to meet the requirement for the isochronous function. Also, at least one of the nodes meeting the requirement for the isochronous function is required to have the cycle master function. Further, at least one of the nodes connected to the IEEE1394 serial buses 6-1 to 6-3 is required to have the function as an isochronous resource manager.

Figure 7:
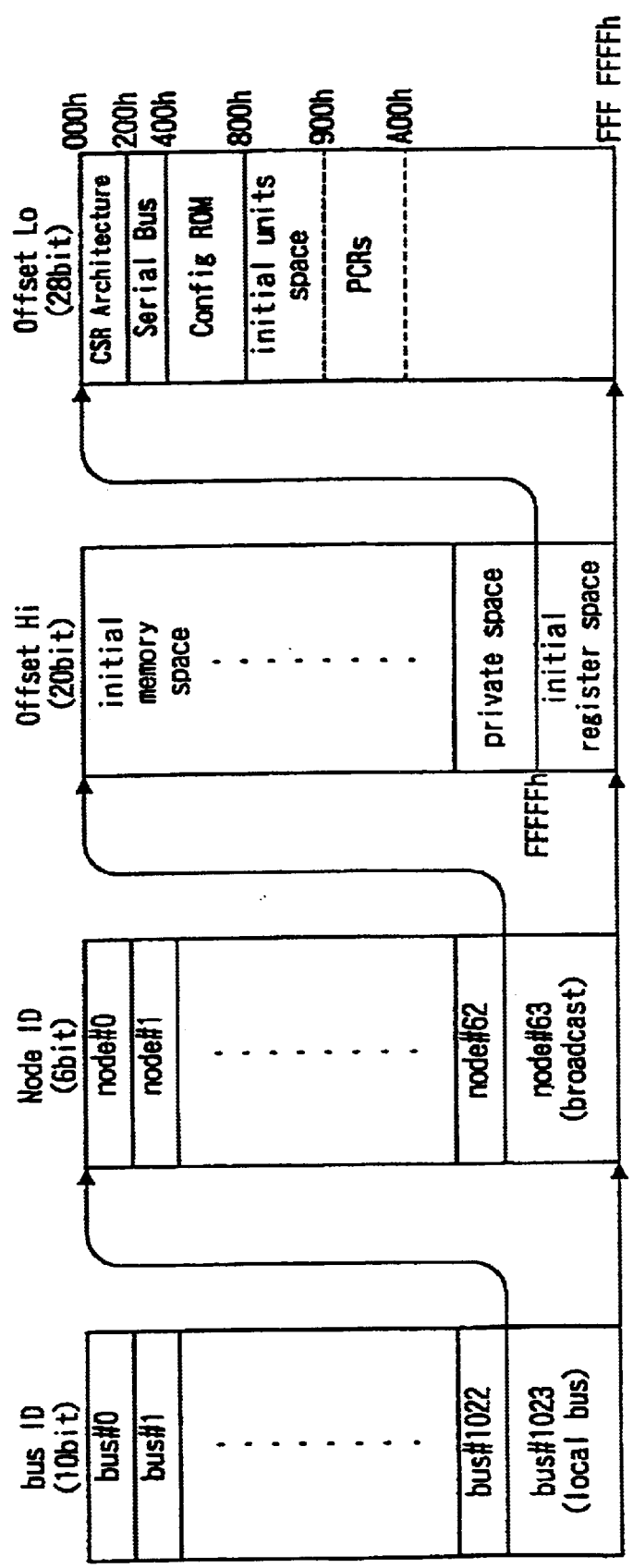
FIG. 7 is a diagram for explaining the structure of the address space of the CSR architecture.

The IEEE1394 is based on the CSR (control & status register) architecture having an address space of 64 bits specified under ISO/IEC13213. FIG. 7 is a diagram for explaining the structure of the address space of the CSR architecture. The most significant 16 bits are a node ID indicating a node of each IEEE1394, and the remaining 48 bits are used for designating the address space assigned to each node. These most significant 16 bits are further divided into a bus ID of 10 bits and a physical ID (a node ID in the narrow sense of the word) of 6 bits. The value at which all the bits assume 1 is used for a special purpose, so that 1023 buses and 63 nodes can be designated.

The space defined by the most significant 20 bits out of the address space of 256 terabytes specified by the least significant 48 bits is divided into an initial register space used for a register unique to CSR of 2048 bytes and a register unique to IEEE1394, a private space and an initial memory space. The space defined by the least significant 28 bits, on the other hand, is used as a configuration ROM, an initial unit space unique to the node or a plug control register (PCR), in the case where the spaced defined by the most significant 20 bits is an initial register space.

FIG. 8 is a diagram for explaining the address offset and the name (contents) of a main CSR. The address offset shown in FIG. 8 is defined as an offset value of the address started from FFFFF0000000h (the last numeral with h indicates the hexadecimal notation) at which the initial register space begins.

With regard to the functions, the state clear register of the offset 000h indicates the state and the control information, the state set register having the offset 004h indicates that the state clear bit is set, the node ID register having the offset 008h indicates the node ID of 16 bits, the reset start register having an offset 00Ch indicates that the command reset is started, the split timeout register having an offset of 0.18h to 01Ch defines the maximum time of split, the cycle time register having an offset 200h indicates the cycle time, the busy timeout register having an offset 210h defines the limitation of the retrial, and the bus manager register having an offset 21Ch indicates a bus manager ID.

The bandwidth available register having an offset 220h indicates a band allocable to the isochronous communication, so that only the value of the node operating as an isochronous resource manager is regarded to be effective. Specifically, the CSR in FIG. 7 is held by each node, but the bandwidth available register of only the isochronous resource manager is considered effective. In other words, substantially, only the isochronous resource manager holds the bandwidth available register. The bandwidth available register holds the maximum value in the case where no band is allocated to the isochronous communication, and the value thereof decreases with each band allocation.

Figure 9:
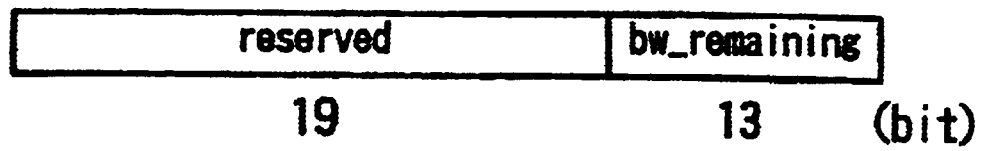
FIG. 9 is a diagram showing a bit configuration of a bandwise available register.

The channels available register of the offset 224h to 228h has the bits thereof corresponding to the channel numbers 0 to 63, respectively. In the case where the bit is zero, it indicates that the channel involved is already allocated. Only the channels available register of the node operating as an isochronous resource manager is effective. FIG. 9 is a diagram showing a bit configuration of the bandwidth available register. In the case where no band is allocated to the isochronous communication of the bus 6, the least significant 13 bits of the bandwidth available register (bw_ remaining in FIG. 9) holds the maximum value 4915 corresponding to 100 μs, and each time the band is allocated, the value thereof decreases.

Figure 10:
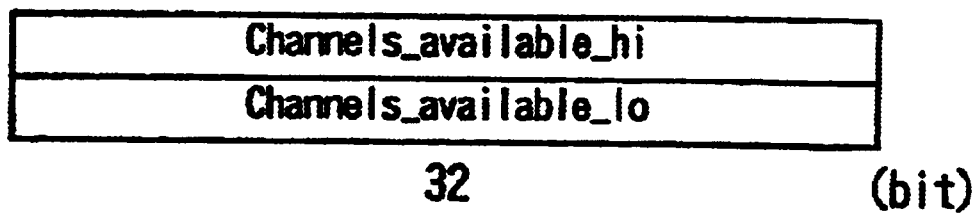
FIG. 10 is a diagram showing a bit configuration of a channel available register.

FIG. 10 is a diagram showing a bit configuration of the channels available register. The register having an offset 224h stores the bits corresponding to the channel numbers 32 to 63, and the register having an offset 228 stores the bits corresponding to the channel numbers 0 to 31.

For controlling the input and output of the equipment through the interface, each node has a PCR (Plug Control Register) defined in IEC1883 at the addresses 900h to 9FFh in the initial unit space of FIG. 7. This is a substantiation of the concept "plug" in order to form a signal route analogous to the logical analog interface. FIG. 11 is a diagram for explaining the configuration of the PCR. The PCR has an oPCR (output Plug Control Register) indicating an output plug and an iPCR (input Plug Control Register) indicating an input plug. Also, PCR has a register oMPR (output Master Plug Register) and a register iMPR (input Master Plug Register) indicating the information of the output plug or the input plug, respectively, unique to each equipment. Each equipment cannot have a plurality of oMPRs and iMPRs, but can have a plurality of oPCRs and iPCRs depending on the capability of the equipment involved. The PCR shown in FIG. 11 has 31 oPCRs and iPCRs, respectively. The flow of the isochronous data is controlled by operating the register corresponding to each of these plugs.

FIG. 12 is a diagram showing a configuration of oMPR, oPCR, iMPR and iPCR. FIG. 12(A) shows the configuration of oMPR, FIG. 12(B) shows the configuration of oPCR, FIG. 12(C) shows the configuration of iMPR, and FIG. 12(D) shows the configuration of iPCR. The data rate capability of the two bits on MSB side of oMPR and iMPR stores the code indicating the maximum transmission rate of the isochronous data transmissible or receivable by the particular equipment. The broadcast channel base of oMPR defines the number of the channel used for the broadcast output.

The number of output plugs of 5 bits on the LSB side of oMPR stores the value indicating the number of the output plugs, i.e. the number of oPCRs of the particular equipment. The number of output plugs of 5 bits on the LSB side of iMPR stores the value indicating the number of the input plugs, i.e. the number of iPCRs of the particular equipment. The non-persistent extension field and the persistent extension field are the fields defined for future expansion.

The on-line of the MSB of oPCR and iPCR indicates the manner in which the plugs are used. Specifically, in the case where the value is 1, it indicates that the plug involved is on-line, and if the value is 0, it indicates the plug involved is off-line. The value of the broadcast connection counter of oPCR and iPCR indicates the presence (1) or absence (0) of the broadcast connection. The value of the point-to-point connection counter having a width of 6 bits of oPCR and iPCR indicates the number of the point-to-point connections of the particular plugs.

The value of the channel number having a width of 6 bits of oPCR and iPCR indicates the number of the isochronous channel connected with the plug. The value of the data rate having a width of 2 bits of oPCR indicates the actual transmission rate of the packet of the isochronous data output from the particular plug. The code stored in the overhead ID having a width of 4 bits of oPCR indicates the bandwidth of the overhead for isochronous communication. The value of the payload having a bit width of 10 bits of oPCR indicates the maximum value of the data contained in the isochronous packet that can be handled by the particular plug.

Figure 13:
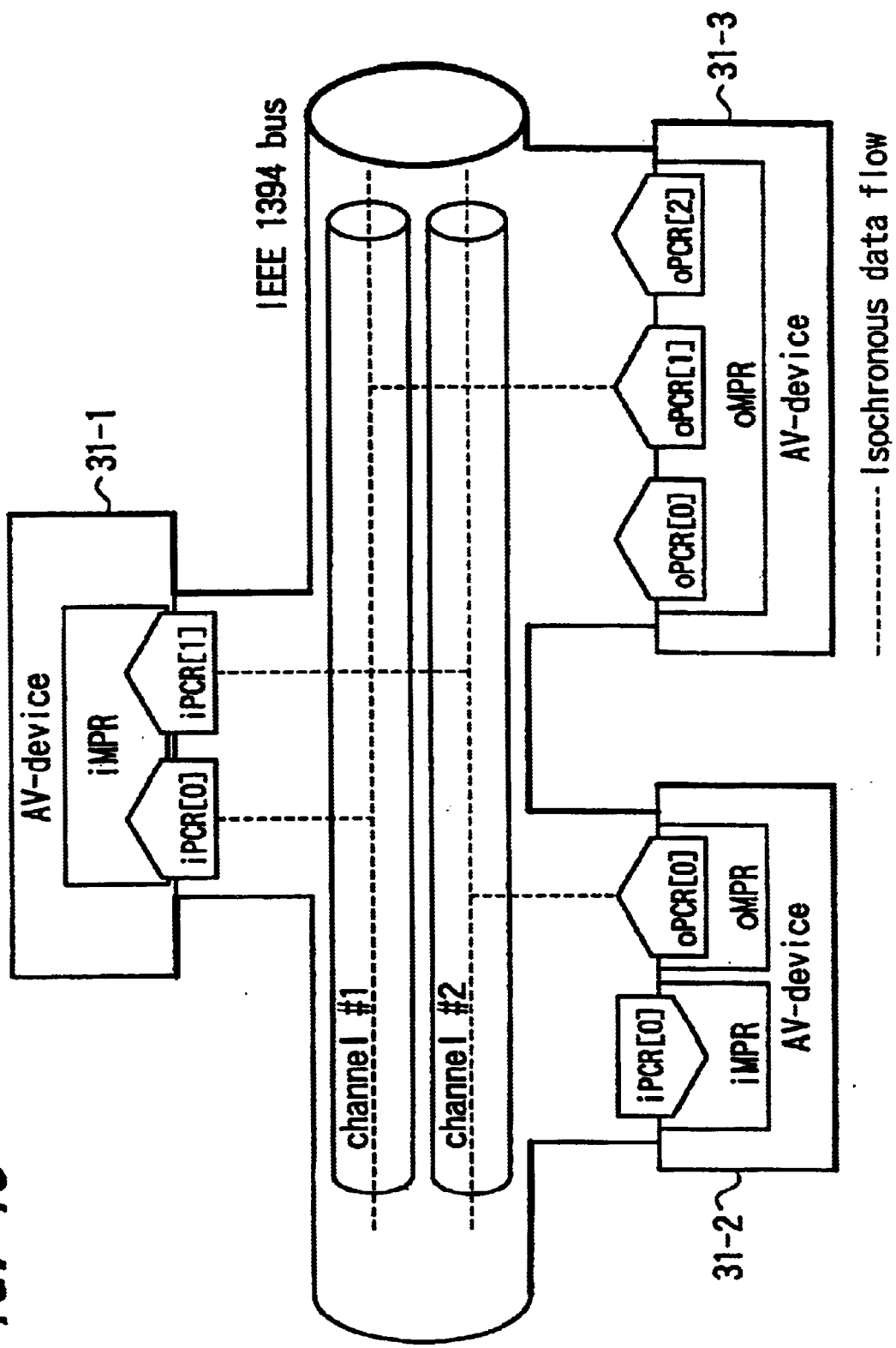
FIG. 13 is a diagram showing the relation between a plug, a plug control register and an isochronous channel.

FIG. 13 is a diagram showing the relation between the plug, the plug control register and the isochronous channel. The AV devices 31-1 to 31-3 are connected by the IEEE1394 serial bus. The isochronous data with the channel thereof designated by oPCR[1] among oPCR[0] to oPCR[2] with the transmission rate and the number of oPCRs designated by the oMPR of the AV device 31-3 is sent out to the channel #1 of the IEEE1394 serial bus. Of iPCR[0] and iPCR[1] specifying the transmission rate and the number of iPCRs by iMPR of the AV device 31-1, the iPCR[0] designating the input channel #1 causes the AV device 31-1 to read the isochronous data sent out to the channel #1 of the IEEE1394 serial bus. In similar fashion, the AV device 31-2 sends out the isochronous data to the channel #2 designated by oPCR [0], and the AV device 31-1 reads the particular isochronous data from the channel #2 designated by iPRC[1].

Figure 14:
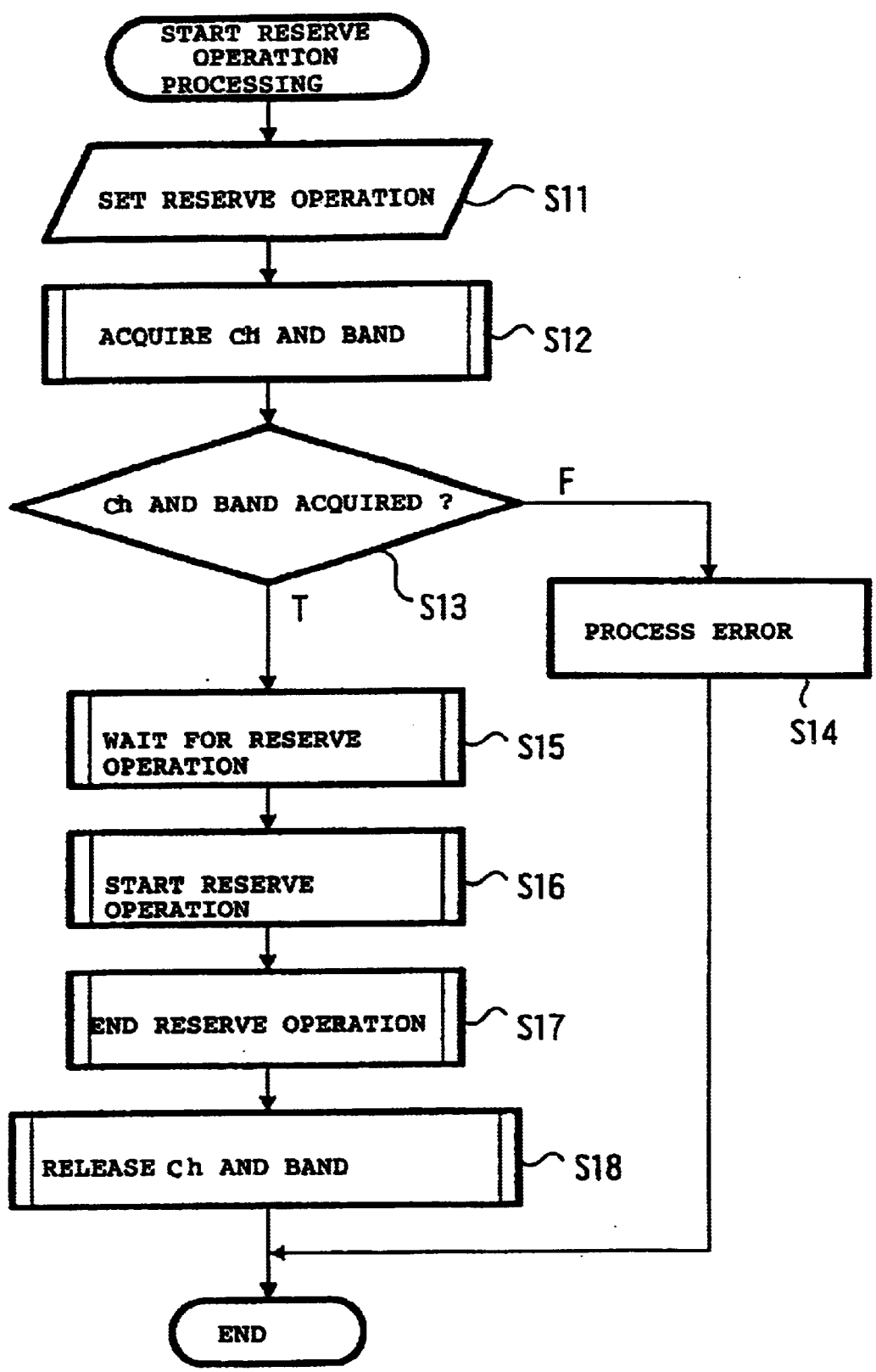
FIG. 14 is a flowchart for explaining the operation of acquiring and releasing the bus resources accompanied by the reserve operation of the IRD.

Then, an explanation will be given of the processing executed in the case where a predetermined signal is received by the IRD 1, sent to the MD deck 3 through the bus 6 and recorded in the MD at a predetermined time. FIG. 14 is a flowchart for explaining the operation of the IRD 1 in this case. In step S11, the user inputs a reserve operation setting in the reserve operation setting unit 22. Specifically, the broadcast channel number received, the broadcast start time and the broadcast end time, etc. are input. By the way, the channel number and the time may be entered by the user directly operating the keys or may be entered selectively out of the program guide indications based on the program guide data transmitted together with the broadcast data as EPG (electronic program guide).

These reservation setting information are transmitted from the reserve operation setting unit 22 to the reserve operation storage unit 24 and stored therein. In step S12, the bus resources reservation unit 25 acquires the channel and the band on the bus required for data transmission to the MD deck 3 (the detail of which will be described later with reference to the flowchart of FIG. 15). The bus resources reservation unit 25 determines in step S13 whether the channel and the band required for data transmission have been secured or not, and in the case where it is determined that the channel and the band required for data transmission have been secured, the bus resources reservation unit 25 notifies the reserve operation execution unit 23.

In the process, in step S15, the reserve operation execution unit 23 executes the reserve operation wait processing described later with reference to FIG. 16, and starts the counting operation by a built-in timer. In step S16, the reserve operation execution unit 23 causes the IRD 1 and the MD deck 3 to execute a predetermined operation at a predetermined time accompanied by data transmission (the detail of which will be described later with reference to FIG. 17). In step S17, the reserve operation execution unit 23 ends the operation of the IRD 1 and the MD deck 3 at a predetermined time. In step 518, the bus resources reservation unit 25 releases the channel and the band (the detail of which will be described later with reference to FIG. 19).

In the case where it is determined in step S13 that the channel and the band required for data transmission cannot be secured, the bus resource reservation unit 25 proceeds to step S14 for executing the error processing. As a result, a message indicating that the channel and the band could not be secured is displayed on the LCD 13. After the error processing in step S14 and the end of the process in step S16, the processing for reserve operation is ended.

Figure 15:
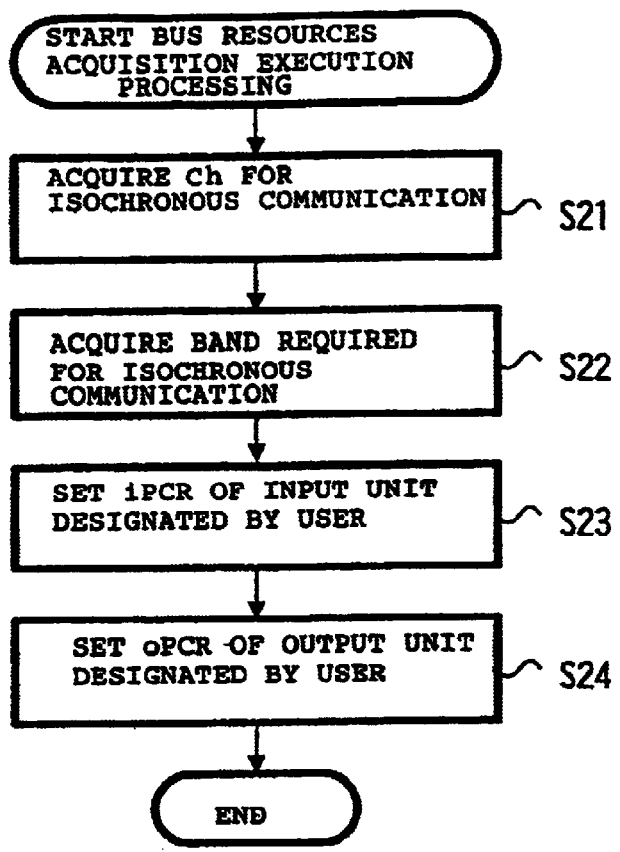
FIG. 15 is a flowchart for explaining the operation of acquiring the channel and band required for data transmission.

FIG. 15 is a flowchart for explaining the operation of the bus resources reservation unit 25 to acquire the channel and the band required for data transmission. In step S21, the bus resources reservation unit 25 requests a node (VTR 4, for example) operating as the isochronous resources manager to acquire the channel for the isochronous communication. The node operating as an isochronous resources manager, in response to this request, sets 0 in the bit corresponding to the vacant channel of the channel available register of CSR. In step S22, the bus resources reservation unit 25 requests the node operating as the isochronous manager to acquire the band required for isochronous communication. In response to this request, the node operating as an isochronous manager reduces the numerical value corresponding to the required band from the value held in the bandwidth available register of CSR.

In step S23, the bus resources reservation unit 25 causes the input equipment designated by the user in step S11 of FIG. 14 to select an unused one (iPCR[j]) of the iPCRs, and sets the number of the isochronous channel to be used (the channel number acquired in step S21) as the channel number thereof, and sets 1 in the point-to-point connection counter. In step S24, the bus resources reservation unit 25 causes the output equipment designated by the user to select the unused one (oPCR[k]) of oPCRs, and sets the same isochronous channel number as the one set in iPCR[j] as a channel number and sets 1 in the point-to-point connection counter thereof.

Once the channel and the band together with the input plug and the output plug are secured in the manner described above, the channel and the band are secured toward the input plug of the designated input equipment from the output plug of the designated output equipment. Thus, the data transmission using them becomes possible.

Figure 16:
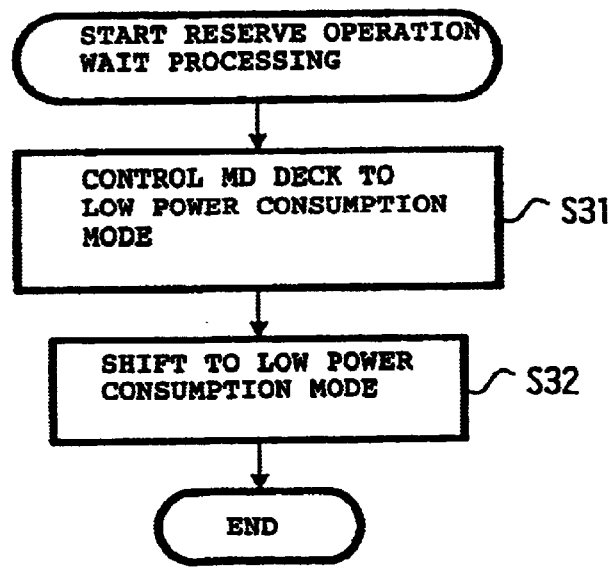
FIG. 16 is a flowchart for explaining the operation of the reserve operation wait processing.

FIG. 16 is a flowchart for explaining the operation of the reserve operation wait processing in step 15 of FIG. 14. In step S31, the reserve operation execution unit 23 transmits a message requesting the MD deck 3 to set in the low power consumption mode. The reserve operation execution unit 43 of the MD deck 3, upon receipt of the same message through the serial bus control unit 45, shifts the MD deck 3 to the low power consumption mode. In step 832, the reserve operation execution unit 23 shifts the IRD 1 itself to the low power consumption mode.

Figure 17:
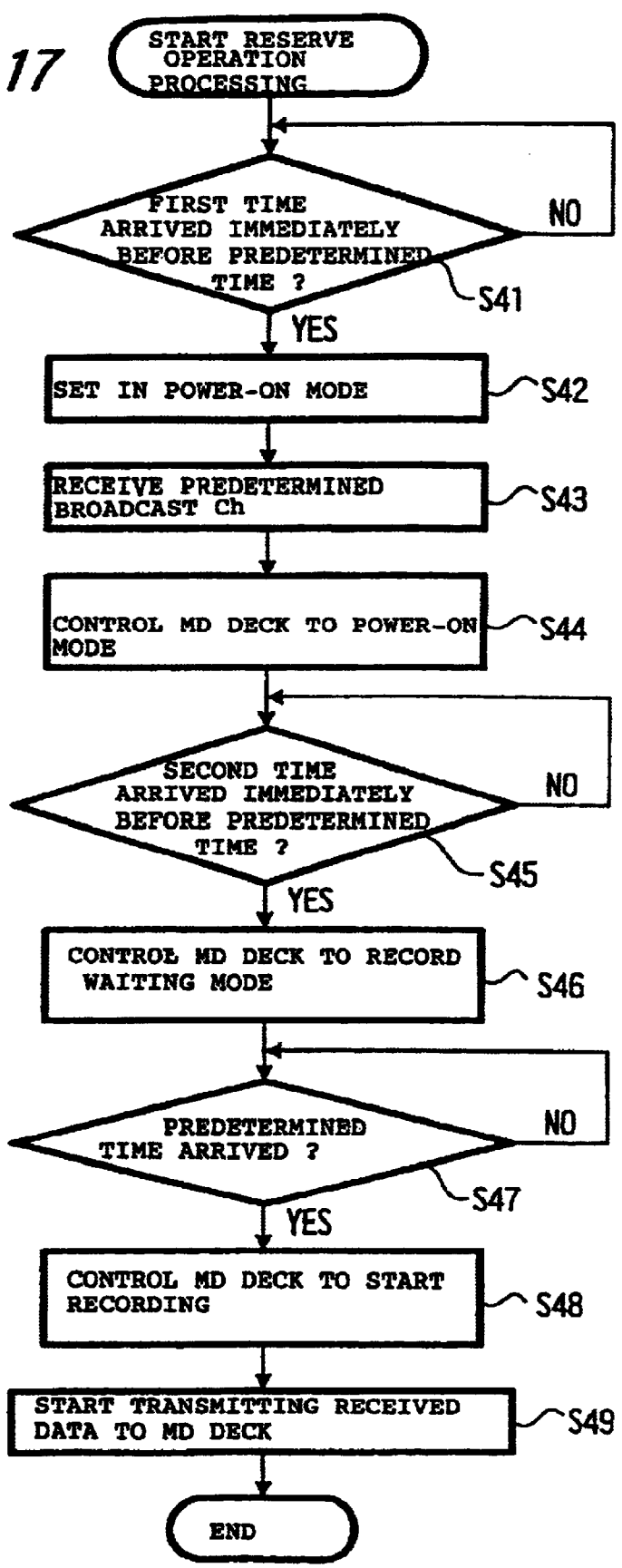
FIG. 17 is a flowchart for explaining the operation of the reserve operation start processing.

FIG. 17 is a flowchart for explaining the operation of the reserve operation start processing in step S16 of FIG. 14. In step S41, the reserve operation execution unit 23 determines whether a first time immediately before a predetermined time stored in the reserve operation storage unit 24 (a predetermined first time length before a predetermined time point) has arrived or not. In the case where it is determined in step S41 that the first time point immediately before the predetermined time point has not arrived yet, the process returns to step S41 for repeating the determination processing. In the case where the determination in step S41 is that the first time point immediately before the predetermined time point has arrived, on the other hand, the process proceeds to step S42, so that the reserve operation execution unit 23 shifts the IRD 1 to the power on mode. In step S43, the reserve operation execution unit 23 causes the tuner unit 21 to receive a predetermined broadcast channel based on the information stored in the reserve operation storage unit 24. In step S44, the reserve operation execution unit 23 transmits a message requesting the MD deck 3 to set in the power on mode. The reserve operation execution unit 43 of the MD deck 3, upon receipt of the same message, transfers the MD deck 3 to the power on mode.

In step S45, the reserve operation execution unit 23 determines whether a second time point (a time point later than the first time point) immediately before a predetermined time point (a time point a predetermined second time length before a predetermined time) stored in the reserve operation storage unit 24 has arrived or not. In the case where it is determined in step S45 that the second time immediately before the predetermined time point has not arrived, the process returns to step S45 for repeating the determination processing. In the case where it is determined in step S45 that the second time point immediately before the predetermined time point has arrived, on the other hand, the process proceeds to step S46, so that the reserve operation execution unit 23 sends a message requesting the MD deck 3 to set in a record wait mode through the serial bus control unit 27. The reserve operation execution unit 43 of the MD deck 3, upon receipt of this message, shifts the MD deck 3 to the record wait mode.

In step S47, the reserve operation execution unit 23 determines whether the predetermined time point stored in the reserve operation storage unit 24 has arrived or not. In the case where the determination in step S47 is that the predetermined time point has not yet arrived, the process returns to step S47 for repeating the determination processing. In the case where the determination in step S47 is that the predetermined time point (the record starting time point) has arrived, the process proceeds to step S48, so that the reserve operation execution unit 23 sends a message requesting the MD deck 3 to start recording through the serial bus control unit 27. The reserve operation execution unit 43 of the MD deck 3, upon receipt of the message, causes the MD deck 3 to start recording. In step S49, the reserve operation execution unit 23 starts transmitting the data received in the tuner 21 to the MD deck 3 through the bus 6 from the serial bus control unit 27.

Figure 18:
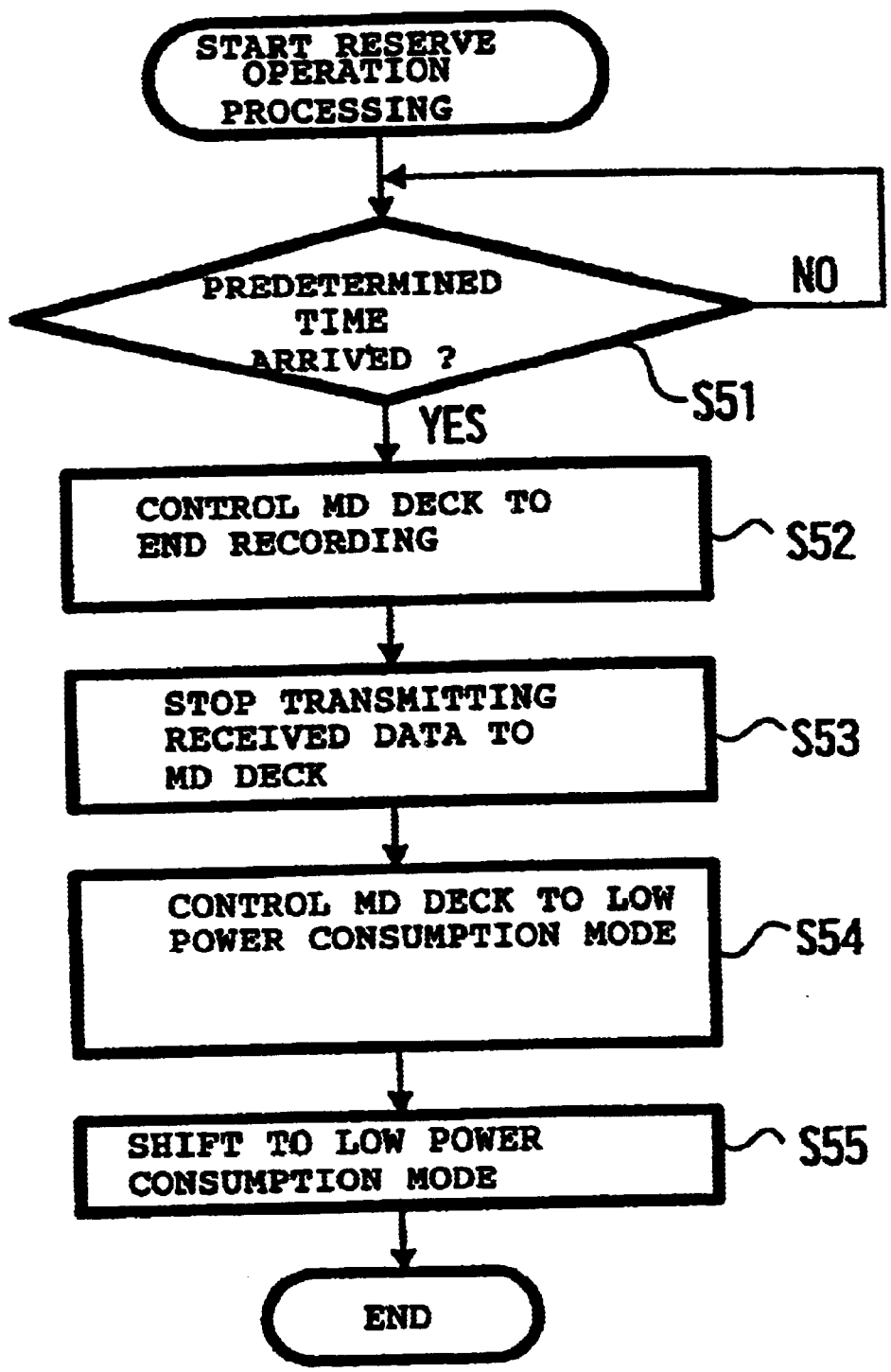
FIG. 18 is a flowchart for explaining the operation of the reserve operation end processing.

FIG. 18 is a flowchart for explaining the operation of the reserve operation end processing in step S17 of FIG. 14. In step S51, the reserve operation execution unit 23 determines whether the predetermined time point stored in the reserve operation storage unit 24 has arrived or not. In the case where it is determined in step S51 that the predetermined time point has not arrived, the process returns to step S51 for repeating the determination processing. In the case where it is determined in step S51 that a predetermined time point (record end time) has arrived, on the other hand, the process proceeds to step S52, so that the reserve operation execution unit 23 sends a message requesting the MD deck 3 to end the recording, through the serial bus control unit 27. The reserve operation execution unit 43 of the MD deck 3, upon receipt of this message, ends the record operation.

In step S53, the reserve operation execution unit 23 of the IRD 1 stops the data transmission to the MD deck 3. In step S54, the reserve operation execution unit 23 sends a message requesting the MD deck 3 to set in the low power consumption mode through the serial bus control unit 27. The reserve operation execution unit 43 of the MD deck 3, upon receipt of this message, shifts the MD deck 3 to the low power consumption mode. In step S55, the reserve operation execution unit 23 shifts the IRD 1 itself to the low power consumption mode.

Figure 19:
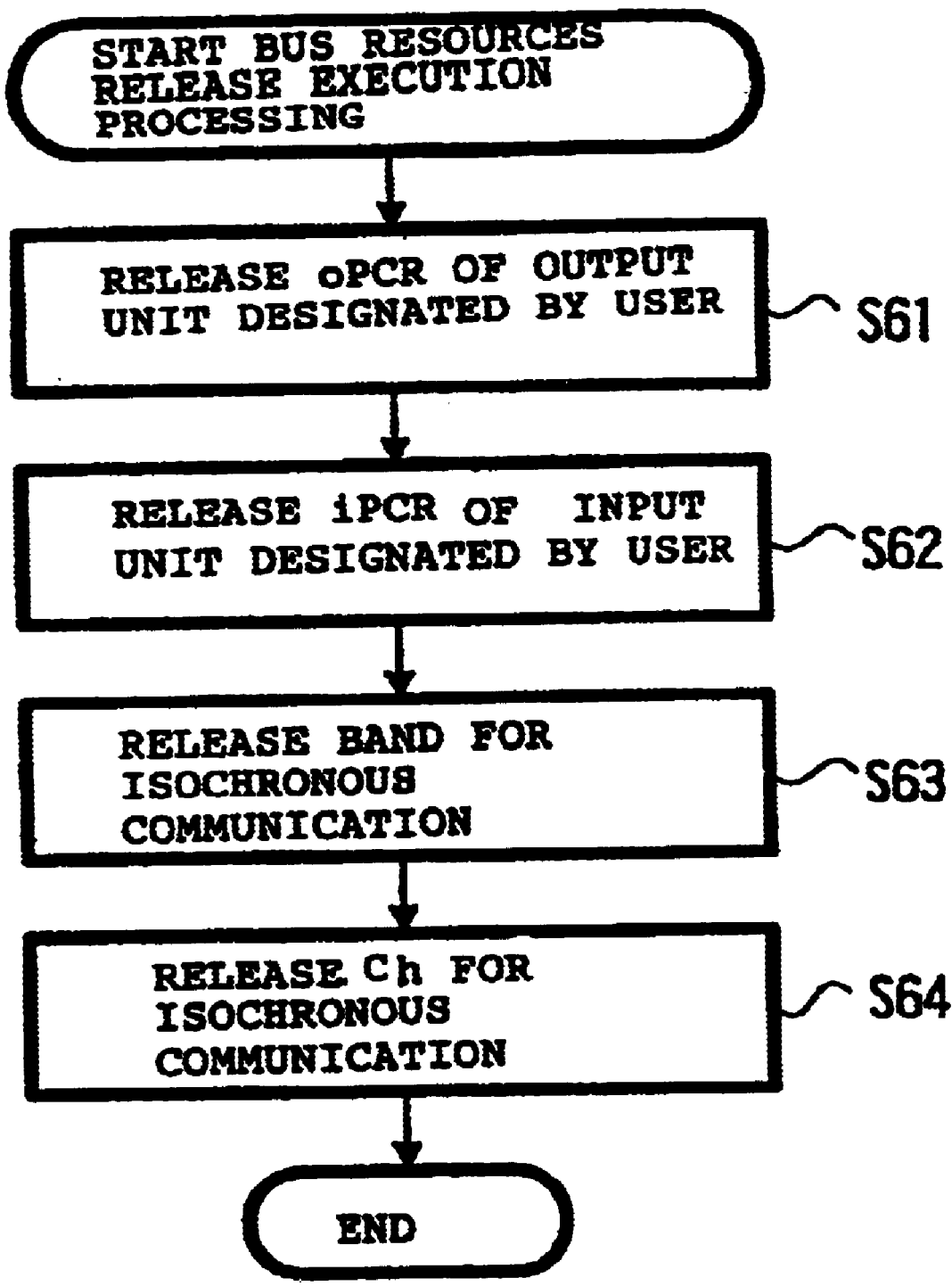
FIG. 19 is a flowchart for explaining the operation of releasing the channel and band required for data transmission.

FIG. 19 is a flowchart for explaining the operation of the bus resources reservation unit 25 disconnecting the input and output in step S18 of FIG. 14 on complete data transmission. In step S61, the bus resources reservation unit 25 clears the channel number of oPCR[k] of the IRD 1 itself and the point-to-point connection counter, and releases the oPCR[k] as not in use. In step S62, the bus resources reservation unit 25 releases iPCR[j] as not in use by clearing the channel number of the iPCR[j] of the MD deck 3 and the point-to-point connection counter.

In step S63, the bus resources reservation unit 25 requests the node (VTR 4) operating as an isochronous resources manager to release the band required for the isochronous communication. In response to this request, the node operating as an isochronous resources manager adds a predetermined numerical value corresponding to the band to be released, to the value held in the bandwidth available register of the CSR. In step S64, the bus resources reservation unit 25 requests the node operating as an isochronous resources manager to release the channel of isochronous communication. In response to this request, the node operating as an isochronous resources manager sets 1 in the bit corresponding to the channels available register of CSR.

Once the bus resources are reserved at the time point when the reserve operation setting is input this way, the particular resources are not occupied by other equipment before the end of the reserve operation. Thus, the equipment that has set the reserve operation can positively use the resources of the bus reserved.

The VTR 4 can have the function similar to the reserve operation setting unit 22, the reserve operation execution unit 23, the reserve operation storage unit 24, the bus resources reservation unit 25, the bus resources reservation plan storage unit 26 and the serial bus control unit 27 of the IRD 1 shown in FIG. 3. In similar fashion, the HDD 5 can have the function similar to the reserve operation setting unit 42, the reserve operation execution unit 43, the reserve operation storage unit 44 and the serial bus control unit 45 of the MD deck 3 shown in FIG. 5. By utilizing the channel and the band of the bus other than those reserved by the IRD 1 at the same predetermined time point as the time point when the IRD 1 receives a predetermined signal, sends and records it to and in the MD deck 3 through the bus 6 and causes it to be recorded in the VTR 4, the VTR 4 can send other predetermined data to the HDD 5 for recording. In this way, even in the case where there exist a plurality of equipment on the bus reserving the bus resources, the operation reserved by each equipment can be positively executed as long as each equipment can secure the resources on the bus.

In the examples described above, the bus resources are secured immediately after a reserve operation. The bus resources, however, can be reserved at any time before the starting time of the reserved operation not immediately after the reserve operation. The processing for securing the bus resources may be performed, for example, a predetermined time before the time to start the reserved operation.

Figure 20:
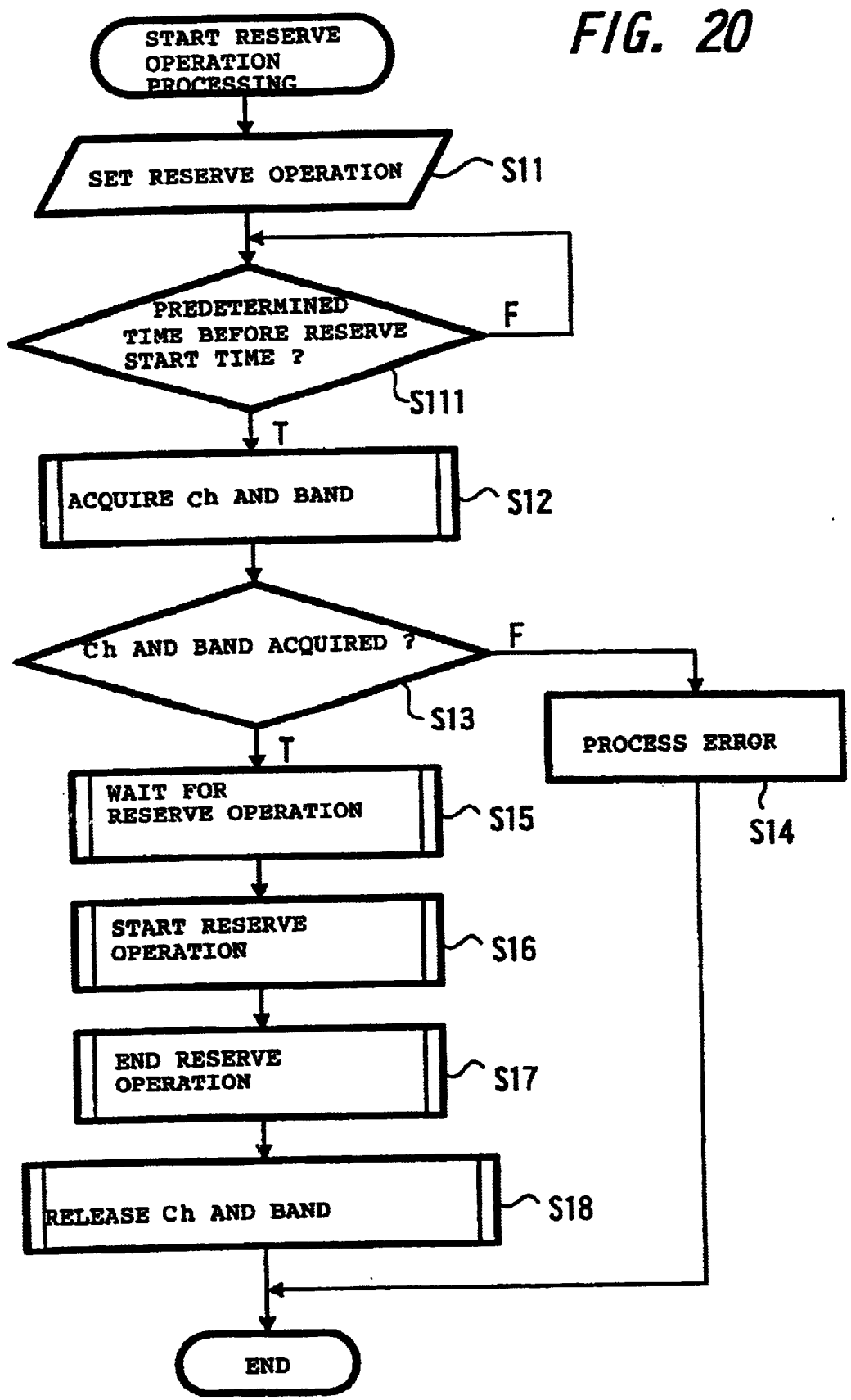
FIG. 20 is a flowchart for explaining another example of the operation of acquiring and releasing the bus resources accompanying the reserve operation of the IRD.

The flowchart of FIG. 20 shows an example of such a processing. In this case, a predetermined signal is received by the IRD 1 at a predetermined time, and sent to the MD deck 3 through the bus 6 and recorded in the MD. In step S11, the user inputs a reserve operation setting in the reserve operation setting unit 22. Specifically, the broadcast channel number to be received, the broadcast starting time and the end time, etc. are input. These reservation setting information are transmitted from the reserve operation setting unit 22 to and stored in the reserve operation storage unit 24.

Once the reservation setting information is stored in the reserve operation storage unit 24, the process proceeds to step S111, where the bus resources reservation unit 25 determines whether a time point a predetermined time length before the time point set as a broadcast starting time point has arrived or not. The "predetermined time length before" is defined as the time preset such as 24 hours or one hour. In the case where it is determined that the present time has become the time a predetermined time length before the time set as the broadcast starting time, the process proceeds to step S12, so that the bus resources reservation unit 25 performs the processing for acquiring the channel and the band required for data transmission, and thus secures the resources on the bus. Subsequently, the processing of and after step S13 described above with reference to the flowchart of FIG. 14 is performed, and after the end of the reserve operation, the resources on the bus are released to end the whole process.

By performing the process shown in the flowchart of FIG. 20, even in the case where the reserved broadcast starting time is one week later, for example, the channel and the band on the bus are not kept secured for a long time, but with a certain margin. Correspondingly, the resources on the bus are effectively utilized while securing superior resources for reservation.

In the examples described heretofore, as an error processing in step S14 in the case where the channel and the band could not be acquired in step S13 of the flowchart shown in FIG. 14 (or FIG. 20), a message indicating that the channel and the band could not be secured is displayed on the LCD 13 to end the process. Nevertheless, the process for acquiring the channel and the band can be repeated again.

Figure 21:
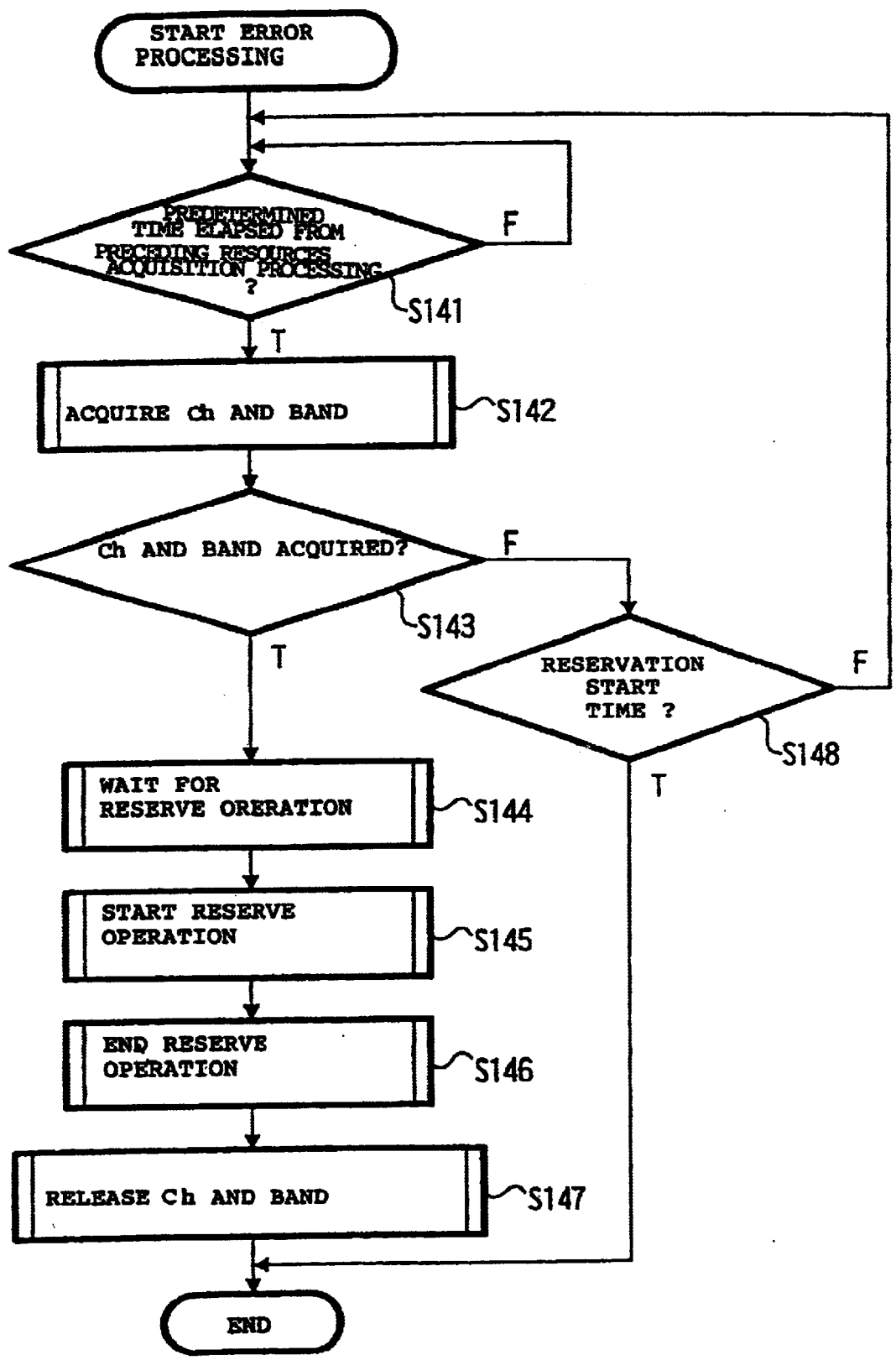
FIG. 21 is a flowchart for explaining still another example of the operation of acquiring and releasing the bus resources accompanying the reserve operation of the IRD.

The flowchart of FIG. 21 shows an example error processing repeated for acquiring the resources again. This processing will be explained below. After proceeding to the error processing of step S14 in the flowchart of FIG. 14 (or FIG. 20), the bus resources reservation unit 25 determines whether a predetermined time has elapsed from the preceding resources acquisition processing (step S141). The "predetermined time" herein is assumed to be the time length of about several tens of minutes to several hours.

In the case where it is determined in step S141 that the predetermined time has elapsed after the preceding acquisition processing, the bus resources reservation unit 25 executes the processing for acquiring the channel and the band on the bus 6 required for data transmission to the MD deck 3 (step S142). The bus resources reservation unit 25 determines in step S143 whether the channel and the band required for data transmission have been secured or not, and in the case where it is determined that the channel and the band required for data transmission have been secured, the bus resources reservation unit 25 notifies the reserve operation execution unit 23.

At the same time, in step S144, the reserve operation execution unit 23 executes the reserve operation wait processing, and starts the counting operation with a built-in timer. In step S145 the reserve operation execution unit 23 causes the IRD 1 and the MD deck 3 to execute a predetermined operation accompanied by the data transmission at a predetermined time. In step S146, the reserve operation execution unit 23 ends the operation of the IRD 1 and the MD deck 3 at a predetermined time. In step S147, the bus resources reservation unit 25 releases the channel and the band. The process of steps S144 to S147 in the case where the channel and the band can be acquired in step S143 is the same as the process of steps S15 to S18 shown in the flowchart of FIG. 14.

In the case where the channel and the band required for data transmission could not be secured in step S143, on the other hand, the process proceeds to step S148 for determining whether the broadcast start time input by the reserve setting operation has arrived or not. In the case where it is determined that the broadcast start time has elapsed, the error processing is ended without securing the resources.

In the case where it is determined in step S148 that the broadcast start time has not yet arrived, in contrast, the process returns to step S141, and when it is determined that the predetermined time has elapsed from the preceding acquisition process, the process proceeds to step S142 for repeating the processing for acquiring the resources.

By this processing, even in the case where the first attempt to acquire the bus resources fails, the processing for acquiring the resources is executed again subsequently when the resources becomes available in accordance with the operating conditions of the bus, and therefore the processing for acquiring the resources can be executed more positively. By the way, as the repeated processing for acquiring the resources at the time of the error processing, the operating conditions of the bus may not be determined periodically as in the flowchart of FIG. 21, but the operating conditions of the channel and the band of the bus are monitored ceaselessly, and when it is determined that the channel and the band can be secured, the acquisition processing may be executed.

Now, an explanation will be given of another embodiment of the invention, in which the bus resources for a predetermined time zone are reserved, and the bus resources are not occupied during the other time zones. FIG. 22 is a diagram for explaining the structure of mPRR (master Programmed Recording Register) held by the bus resources reservation plan storage unit 26 of the IRD 1 for storing the time division unit and the date of reservation of the bus resources. The four-bit period field on the MSB (Most Significant Bit) side represents the unit time of the time zone stored in the PRR (Programmed Recording Register) indicating the reservation of the channel and the bus explained below.

FIG. 23 is a diagram for explaining the unit time of PRR for the data stored in the period field of mPRR. Specifically, assuming that 3 is held in the period field, the reservation of the channel and the band of the bus in units of 30 minutes are stored in the PRR. The data held in the 16-bit date field on the LSB (Least Significant Bit) side of mPRR indicates the year, month and date when the reservation is executed. In the case where 1997. 12. 16 is held in the date field of mPRR and 4 in the period field, for example, the PRR holds, in units of hour, the reservation of the channel and the band of the bus on Dec. 16, 1997. The date field of mPRR has not any structure having the data of the year, month and date, but may have the same structure as the BUS_TIME register specified in IEEE1394.

FIG. 24 is a diagram for explaining the PRR structure held in the bus resources reservation plan storage unit 26. The PRR indicates the reservation of the bus channel and the band in unit times of the day. The PRR thus has a structure in which a required number of sets are indicated repeatedly, each having a total of 96 bits including 64 bits for the same structure as the channel available register and 32 bits for the same structure as the bandwidth available register held by the bus manager (VTR 4). The set of 96 bits indicates the channel (64 bits) and the band (13 out of 32 bits) of the bus in a unit time corresponding to the period field of mPRR. PRR has a set of 96 bits providing the quotient of dividing 24 hours by the unit time for the data held in the period field of mPRR.

In the case where 2 is held in the period field, for example, PRR has data of the reservation in units of 15 minutes, and therefore holds 288 sets. The set having the head offset address in 00h corresponds to the unit time from 0:00 of the day, and upon the subsequent lapse of each unit time, the set having an address 0Ch larger of the head indicates the reservation of the channel and the band of the bus. In the case where the unit time is one hour, for example, the reservation of the channel and the band of the bus for 1:00 to 2:00 is stored from the address of 0Ch.

In the 64-bit portion of the same structure as the channel available register, each bit thereof corresponds to each of the channel numbers 0 to 63, of which bit 0 indicates that the particular channel has been reserved at a predetermined time. The 32-bit portion of the same structure as the bandwidth available register, on the other hand, indicates the band allocable to the isochronous communication in a predetermined unit time.

Figure 25:
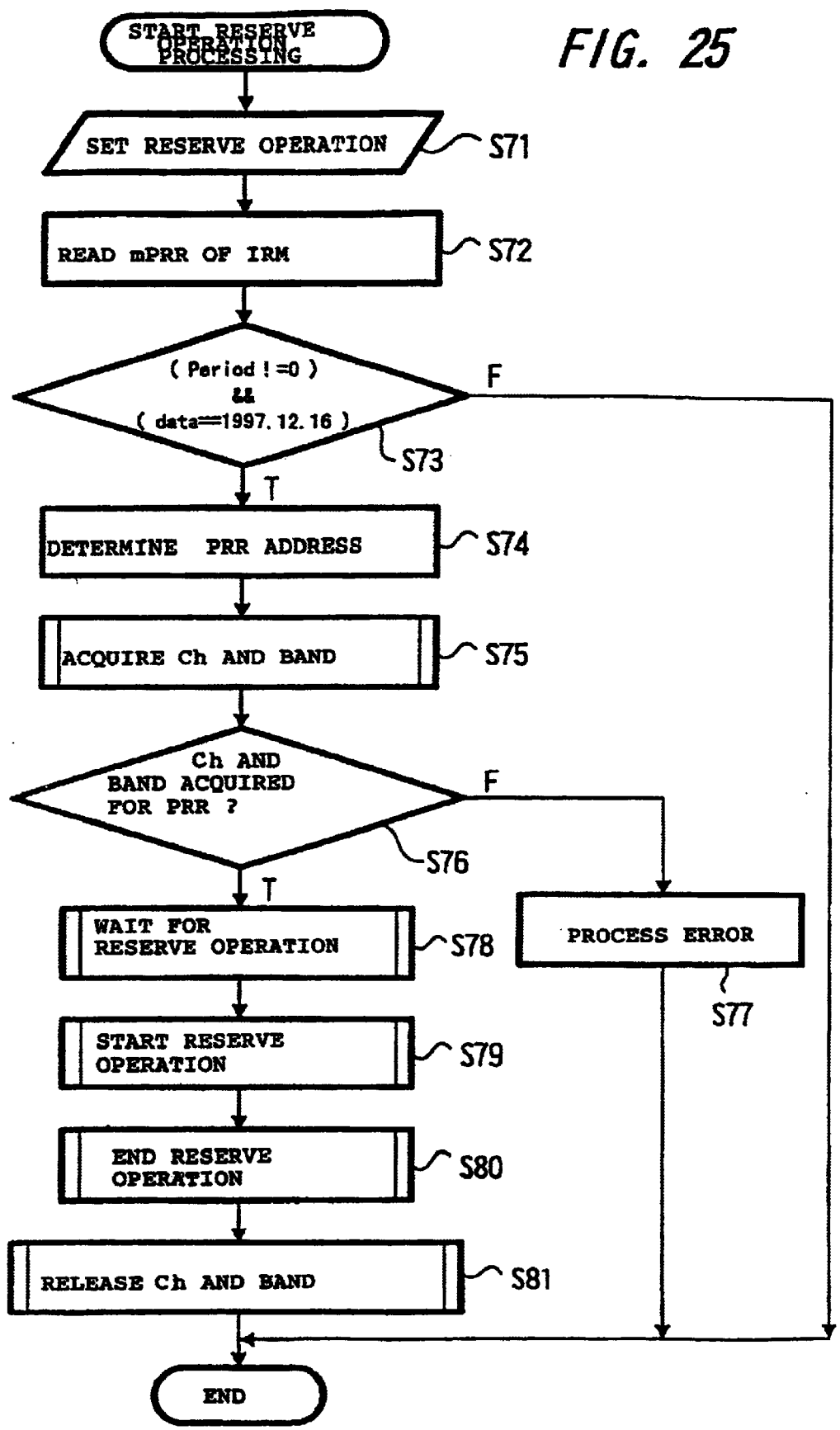
FIG. 25 is a diagram for explaining the operation of acquiring the bus resources using mPRR and PRR.

FIG. 25 is a flowchart for explaining the operation of the IRD 1 for acquiring the bus resources utilizing mPRR and PRR. In step S71, when the reserve operation setting is input to the reserve operation setting unit 22, the reservation setting information is stored in the reserve operation storage unit 24. In step S72, the bus resources reservation unit 25 reads the mPRR information held by the isochronous resources manager (IRM) of the bus resources reservation plan storage unit 26. In step S73, the bus resources reservation unit 25 determines whether the information in the period field is not 0 (0 indicating that the information held in PRR is not effective) and the information in the date field is today or not. In the case where the bus resources reservation unit 25 determines that the information in the period field is not 0 and that the information in the date field is today, then in step S74, the address of the PRR of the bus resources reservation plan storage unit 26 is calculated based on the reservation setting information of the reserve operation storage unit 24 and the information in the period field of mPRR.

Assume, for example, that the period field of mPRR holds 5 and the reservation setting information of the reserve operation storage unit 24 includes the operation using the bus resources for 10:00 to 12:00 of the day. The unit time of PRR is 2 hours, and the reservation of the channel and the band for the particular time zone indicates the 6th set of 96 bits of PRR. Thus, the bus resources reservation unit 25 calculates 3Ch indicating the head offset address of the sixth 96-bit set from the 96-bit set at the offset address 00h of PRR.

In step S75, the bus resources reservation unit 25 acquires the channel and the band for a predetermined time zone based on the address calculated in step S74. In step S76, it is determined whether the channel and the band could be acquired for PRR, and in the case where the determination is that the channel and the band could be so acquired, the process proceeds to step S78, in which the reserve operation execution unit 23 executes the reserve operation wait processing and starts the counting operation with a built-in timer. In step S79, the reserve operation execution unit 23 executes a predetermined operation accompanied by the data transfer from the IRD 1 to the MD deck 3. In step S80, the reserve operation execution unit 23 ends the operation of the IRD 1 and the MD deck 3 at a predetermined time point. In step S81, the bus resources reservation unit 25 releases the channel and the band.

In the case where it is determined in step S76 that the channel and the band cannot be acquired, the process proceeds to step S77 for executing the error processing. In the case where the determination in step S73 is "false", in the case where the error processing ends in step S77 or in the case where the bus resources are released in step S81, then the process ends. By the way, the process of steps S75, S77 and S81 is similar to the process of steps S12, S14 and S18 of FIG. 14, respectively.

Once the bus resources are reserved for a predetermined time zone by mPRR and PRR in this way, the particular bus resources are not occupied until the actual use of the bus resources from the time point when the reserve operation is set. Thus, before starting the use of the bus resources (for a different time zone), other equipment can use the reserved bus resources.

As described above, the bus resources are positively secured and the data transmission is executed positively by the IRD 1 for a time zone in which the reserve operation is set.

By the way, in the processing indicated in the flowchart of FIG. 25, mPRR of the IRM of the bus resources reservation plan storage unit 26 is read to acquire the channel and the band with the arrival of the reserved time. Nevertheless, the channel and the band may be acquired by other processing.

For example, the entity managing the PRR can issue a request for acquiring the channel and the band to IRM.

Also, in the case where the channel and the band could not be secured in step S76 (in the case where the particular channel and the band are already reserved for another processing, for example), the error processing executed in step S77 may be such that not only the fact that the reservation is a simple error is indicated to the IRD, etc. but the user may be inquired of, on display or the like means, how to handle the particular reservation.

Assuming, for example, that the IRD 1 and the MD deck 3 are connected by the bus 6 and also connected by a digital audio signal line or an analog audio signal line (or configured for radio transmission in addition to the physical connection by a signal line), the user may be inquired by display or the like as to whether the received data (digital data or analog signal) is to be transmitted by these signal lines not using the bus 6 for executing the reserved sound recording or not so that the user may select any one of the transmission means. In the case where the resources cannot be secured by the isochronous communication and the audio data or the like are transmitted to the recording equipment by use of a signal line other than the bus 6 but the asynchronous communication by the bus 6 is possible, then the communication may be conducted with the recording equipment by asynchronous communication and the IRD or the like may perform such a control operation as to perform the record operation at a time set by the reserve operation setting. As another alternative, the recording equipment may be controlled as a reserve operation with an infrared signal or the like without using the bus 6.

Assume that a reserve operation using the EPG data received by the IRD is performed as another error processing in the case where the bus resources cannot be reserved, and that the bus resources cannot be secured for the broadcast time of the program indicated in the particular EPG data. Then, the IRD determines from the EPG data whether the same program (video program or music) is rebroadcast for another time zone. In the case where the rebroadcast is determined, the user is inquired by display or the like means as to the appropriateness of sound recording (video recording) during the rebroadcast time. When the user inputs his determination of the process, the processing for acquiring the channel and the band on the bus may be executed again during the rebroadcast time zone.

Also, according to the aforementioned embodiment, the user is assumed to input the reserve operation setting in the reserve operation setting unit 22. Alternatively, the reserve operation setting may be input from the reserve operation setting unit 42 of the MD deck 3. In similar fashion, the reserve operation execution unit 43 or the reserve operation storage unit 44 of the MD deck 3 may execute with equal effect the processing which otherwise might be executed by the reserve operation execution unit 23 or the reserve operation storage unit 24 of the IRD 1, respectively.

Further, the bus resources reservation unit 25 may produce mPRR and PRR of the day based on the reservation information for the day, stored in the reserve operation storage unit 44 of the equipment connected to the bus connected with the IRD 1, and may store it in the bus resources reservation plan storage unit 26. By so doing, the bus resources reservation plan storage unit 26 is not required to have a plurality of mPRRs or PRRs, and the same effect can be obtained for the reservation on the next and subsequent days. Further, although mPRR and PRR are assumed to be held in the bus resources reservation plan storage unit 26, the isochronous resources manager may be assumed to have it to perform a similar operation to the bus resources reservation plan storage unit 26 with equal effect.

Also, in this specification, a "system" is assumed to indicate the whole configuration of a plurality of apparatuses. The reservation processing described above may be realized by a distribution of a plurality of apparatuses connected to the bus in the system. Specifically, for example, the reserve operation setting input means supplied with the setting of the reserve operation and the reserve operation storage means for storing the reserve operation information input from the reserve operation setting input means and outputting the reserve operation information in response to a request from other equipment are incorporated in one equipment connected to the bus, while the bus resources reservation means for reserving the resources on the bus required for the reserve operation based on the reserve operation information supplied from the first equipment is incorporated in the other equipment connected to the bus, so that using the resources reserved in the particular other equipment, the first equipment may transmit data to still another equipment during the reserved time.

Further, the computer program for performing the processing described above may be provided to the user using some medium and the program thus provided may be executed by the computer or the like thereby to control the equipment connected to the bus in similar fashion. In this case, the distribution medium provided to the user may include a network such as the internet and a satellite line or the like communication media, as well as a magnetic disk, a CD-ROM, a solid memory or the like recording medium.

What is claimed is:

1. A method of reserving an isochronous channel on a serial bus connecting a plurality of information processing devices, comprising the steps of:

inputting a reservation for the isochronous channel for use by a designated device on the serial bus at a reservation start time; the input reservation including a channel number, an input information processing device, an output information processing device, the reservation start time, and a reservation stop time;

storing the input reservation in a storage means; and reserving bandwidth on said serial bus for the isochronous channel on the basis of said reservation at a predetermined time prior to said reservation start time; the reserving bandwidth step comprising the steps of:
acquiring the isochronous channel;
acquiring the required bandwidth on the acquired isochronous channel;
setting the input plug control register of the input information processing device; and
setting the output plug control register of the output information processing device.

2. The method according to claim 1, wherein the predetermined time is the time at which the reservation is input.

3. The method according to claim 1, further comprising the step of operating the designated device to use the isochronous channel in accordance with the reservation.

4. The method according to claim 1, further comprising the step of releasing the reserved bandwidth on said serial bus at the reservation stop time.

5. An information processing apparatus for reserving an isochronous channel on a serial bus connecting a plurality of information processing devices, comprising:

reservation input means for inputting a reservation for the isochronous channel for use by a designated device on the serial bus at a reservation start time; the input reservation including a channel number, an input information processing device, an output information processing device, the reservation start time, and a reservation stop time;

storage means for storing the input reservation; and reservation means for reserving bandwidth on said serial bus for the isochronous channel on the basis of said reservation at a predetermined time prior to said reservation start time; the reservation means comprising:
means for acquiring the isochronous channel;
means for acquiring the required bandwidth on the acquired isochronous channel;
means for setting the input plug control register of the input information processing device; and
means for setting the output plug control register of the output information processing device.

6. The apparatus according to claim 5, wherein the reservation means secures the bandwidth for the isochronous channel.

7. The apparatus according to claim 6, wherein if the reservation means cannot secure the bandwidth at the predetermined time, then the reservation means repetitively executes until the bandwidth is secured.

8. The apparatus according to claim 5, wherein the predetermined time is the time at which the reservation is input.

9. The apparatus according to claim 5, further comprising reservation operating means for operating the designated device to use the isochronous channel in accordance with the reservation.

10. The apparatus according to claim 5, further comprising releasing means for releasing the reserved bandwidth on said serial bus at the reservation stop time.

* * * * *